United States Patent
Liu et al.

(10) Patent No.: US 12,302,200 B2
(45) Date of Patent: May 13, 2025

(54) METHOD AND APPARATUS FOR INDICATING, OBTAINING, AND SENDING AUTOMATED DRIVING INFORMATION

(71) Applicant: Shenzhen Yinwang Intelligent Technologies Co., Ltd., Shenzhen (CN)

(72) Inventors: Hang Liu, Beijing (CN); Mingchao Li, Beijing (CN)

(73) Assignee: Shenzhen Yinwang Intelligent Technologies Co., Ltd., Shenzhen (CN)

(*) Notice: Subject to any disclaimer, the term of this patent is extended or adjusted under 35 U.S.C. 154(b) by 247 days.

(21) Appl. No.: 17/543,355

(22) Filed: Dec. 6, 2021

(65) Prior Publication Data
US 2022/0095086 A1 Mar. 24, 2022

Related U.S. Application Data

(63) Continuation of application No. PCT/CN2020/091736, filed on May 22, 2020.

(30) Foreign Application Priority Data
Jun. 5, 2019 (CN) .......................... 201910488363.7

(51) Int. Cl.
*H04W 4/40* (2018.01)
*B60W 60/00* (2020.01)

(52) U.S. Cl.
CPC ............ *H04W 4/40* (2018.02); *B60W 60/001* (2020.02)

(58) Field of Classification Search
CPC .......... H04L 27/2601; H04W 28/0268; H04W 28/10; H04W 76/10; H04W 80/02;
(Continued)

(56) References Cited

U.S. PATENT DOCUMENTS

2013/0344856 A1* 12/2013 Silver ............... G06F 16/24578
455/418
2014/0266789 A1* 9/2014 Matus ...................... H04Q 9/00
340/870.07
(Continued)

FOREIGN PATENT DOCUMENTS

| CN | 105346483 A | 2/2016 |
|---|---|---|
| CN | 105346486 A | 2/2016 |

(Continued)

OTHER PUBLICATIONS

Xiao Yan et al., "Function Requirement Analysis of Signaling System for Total Automatic Driving," Railway Signalling and Communication, vol. 50 No. 12, Total 4 pages (Dec. 2014). With an English abstract.

(Continued)

*Primary Examiner* — Nathan S Taylor
(74) *Attorney, Agent, or Firm* — Leydig, Voit & Mayer, Ltd.

(57) ABSTRACT

A method for indicating, obtaining, and sending automated driving information includes: starting, by a first vehicle, an automated driving function application, or receiving, by a first vehicle, an instruction used to instruct the first vehicle to start an automated driving function application; and indicating, by the first vehicle by using first indication information, that a driving status of the first vehicle is an automated driving state. A vehicle having an automated driving function sends the automated driving information to a surrounding traffic participant, especially to a surrounding vehicle or a pedestrian, so that the surrounding traffic participant identifies the automated driving vehicle, to improve traffic safety of an entire road.

15 Claims, 4 Drawing Sheets

(58) Field of Classification Search
CPC ..... H04W 76/12; H04W 28/02; H04W 80/10; H04W 76/20; H04W 4/40; H04W 4/46; H04W 4/44; B60W 60/001; B60W 60/00; G05D 1/02
USPC .......................................................... 370/31
See application file for complete search history.

(56) References Cited

U.S. PATENT DOCUMENTS

| | | | |
|---|---|---|---|
| 2017/0336797 A1* | 11/2017 | Abe | G05D 1/0212 |
| 2017/0351256 A1* | 12/2017 | Kumakiri | B60W 60/0053 |
| 2018/0157262 A1* | 6/2018 | Ao | G05D 1/0231 |
| 2018/0345980 A1* | 12/2018 | Morita | G05D 1/0061 |
| 2019/0047586 A1* | 2/2019 | Sekine | B60W 60/0051 |
| 2019/0065993 A1* | 2/2019 | Srinivasan | G06N 5/025 |
| 2019/0111784 A1* | 4/2019 | Tsuda | G08G 1/0116 |
| 2019/0135305 A1* | 5/2019 | Laine | B60K 35/00 |
| 2019/0202297 A1* | 7/2019 | Konishi | B60W 20/00 |
| 2019/0232955 A1* | 8/2019 | Grimm | G06V 10/803 |
| 2019/0276048 A1* | 9/2019 | Suzuki | B60W 50/14 |
| 2019/0278266 A1* | 9/2019 | Matsuda | G05D 1/0061 |
| 2019/0286127 A1* | 9/2019 | Watanabe | B62D 15/025 |
| 2019/0286128 A1* | 9/2019 | Kaji | B60W 50/14 |
| 2019/0299991 A1* | 10/2019 | Horii | B60W 60/00274 |
| 2019/0324451 A1* | 10/2019 | Obata | G08G 1/16 |
| 2019/0329791 A1* | 10/2019 | Oba | B60K 28/063 |
| 2019/0366914 A1* | 12/2019 | Ochida | B60Q 1/44 |
| 2020/0079398 A1* | 3/2020 | Matsumoto | B60W 40/105 |
| 2020/0117192 A1* | 4/2020 | Satoh | B62D 6/00 |
| 2020/0221349 A1* | 7/2020 | Nakata | H04W 4/44 |
| 2020/0273265 A1* | 8/2020 | Barnes | G06N 5/025 |
| 2020/0290619 A1* | 9/2020 | Mehdi | B60W 60/0011 |
| 2020/0298876 A1* | 9/2020 | Mimura | B60R 16/02 |
| 2020/0298887 A1* | 9/2020 | Mukai | B60W 60/0059 |
| 2020/0307648 A1* | 10/2020 | Noguchi | G06Q 10/02 |
| 2020/0385016 A1* | 12/2020 | Noguchi | G08G 1/096811 |
| 2021/0009034 A1* | 1/2021 | Morimura | B60Q 1/547 |
| 2021/0011150 A1* | 1/2021 | Bialer | G01S 13/60 |
| 2021/0067927 A1* | 3/2021 | Mizukoshi | H04W 4/48 |
| 2021/0094465 A1* | 4/2021 | Yamasaki | B60W 50/082 |
| 2021/0094580 A1* | 4/2021 | Uraki | G01S 17/931 |
| 2021/0138904 A1* | 5/2021 | Ono | B60K 35/00 |
| 2021/0146943 A1* | 5/2021 | Oniwa | B60R 21/00 |
| 2021/0146962 A1* | 5/2021 | Kaji | B60W 30/17 |
| 2021/0216066 A1* | 7/2021 | Shimotani | B60W 60/001 |
| 2022/0227280 A1* | 7/2022 | Thieberger | B60P 3/073 |

FOREIGN PATENT DOCUMENTS

| | | |
|---|---|---|
| CN | 106292432 A | 1/2017 |
| CN | 107305741 A | 10/2017 |
| CN | 107749193 A | 3/2018 |
| CN | 108352112 A | 7/2018 |
| CN | 109765891 A | 5/2019 |
| JP | 2017007417 A | 1/2017 |
| JP | 6432948 B2 | 12/2018 |
| KR | 101944478 B1 | 1/2019 |

OTHER PUBLICATIONS

Bao Lixia et al., "Thinking on the Collaborative Construction of Transportation Infrastructure in the Environment of Autonomous Driving," Transportation and Transportation, Total 4 pages (Feb. 2018). With an English abstract.

Intel Corporation, "QoS Management and Congestion Control for NR V2X Sidelink Communication," 3GPP TSG RAN WG1 Meeting #95, Spokane, USA, R1-1812495, total 11 pages, 3rd Generation Partnership Project, Valbonne, France (Nov. 12-16, 2018).

ZTE, Sanechips, "Considerations on NR V2X," 3GPP TSG RAN WG3 Meeting #102, Spokane, USA, R3-186422, total 3 pages, 3rd Generation Partnership Project, Valbonne, France (Nov. 12-16, 2018).

* cited by examiner

METHOD AND APPARATUS FOR INDICATING, OBTAINING, AND SENDING AUTOMATED DRIVING INFORMATION

CROSS-REFERENCE TO RELATED APPLICATIONS

This application is a continuation of International Application No. PCT/CN2020/091736, filed on May 22, 2020, which claims priority to Chinese Patent Application No. 201910488363.7, filed on Jun. 5, 2019. The disclosures of the aforementioned applications are hereby incorporated by reference in their entireties.

TECHNICAL FIELD

Embodiments of this application relate to computer technologies and/or communications technologies, and in particular, to a method and apparatus for indicating and sending automated driving information and the like.

BACKGROUND

With development of science and technology and application of an artificial intelligence technology, an automated driving technology is rapidly developed and widely applied. Based on a driving automation level of a vehicle, an existing SAE J3016 standard classifies driving automation into six levels, namely, L0 to L5: no driving automation (No Automation, L0), driver assistance (L1), partial driving automation (Partial Automation, L2), conditional driving automation (Conditional Automation, L3), high driving automation (High Automation, L4), and full driving automation (Full Automation, L5). With continuous improvement of a driving automation level, a participation degree of people in driving activities is lower. It is foreseeable that more automated driving vehicles will travel on a road in the future, so that a situation in which an automated driving vehicle and a manual driving vehicle are on the road at the same time occurs.

In a related technology, a current driving level of an automated driving vehicle (a vehicle with an automated driving function) cannot be compared with a level of a skilled human driver. For example, there is still a large gap between the automated driving vehicle and a human driver in terms of environment cognition capability, and decision-making capability and response capability on an emergency situation. Therefore, when the automated driving vehicle (the vehicle with the automated driving function) runs on a public road, the automated driving vehicle needs to send information or an indication related to automated driving of the automated driving vehicle to a surrounding traffic participant, especially a conventional human-driving vehicle, a pedestrian, and the like, to attract attention of the surrounding traffic participant.

SUMMARY

According to a method and apparatus for indicating, obtaining, and sending automated driving information, and a system for indicating automated driving information that are provided in this application, a surrounding traffic participant can identify, based on indication information of a first vehicle or a sent message, that a driving status of the first vehicle is an automated driving state, to attract attention of the surrounding traffic participant and improve traffic safety of an entire road.

To achieve the foregoing objective, the following technical solutions are used in this application.

According to a first aspect, an embodiment of this application provides a method for indicating automated driving information, where the method includes: A first vehicle starts an automated driving function application, or a first vehicle receives an instruction used to instruct the first vehicle to start an automated driving function application; and the first vehicle indicates, by using first indication information, that a driving status of the first vehicle is an automated driving state; and/or a first vehicle starts an automated driving function application, or a first vehicle receives an instruction used to instruct the first vehicle to start an automated driving function application; and the first vehicle sends a first message, where the first message includes first indication information, and the first indication information indicates that a driving status of the first vehicle is an automated driving state.

The first vehicle may send the first message to a roadside device, a pedestrian, or the like disposed around a road (for example, on one side of the road or on two sides of the road), or may send the first message to a second vehicle around the first vehicle.

In the foregoing manner, the first vehicle may indicate that the driving status of the first vehicle is the automated driving state, or send the first message to indicate that the driving status of the first vehicle is the automated driving state. Therefore, a surrounding traffic participant identifies, based on the indication information of the first vehicle or the sent message, that the driving status of the first vehicle is the automated driving state, to attract attention of the surrounding traffic participant, and improve traffic safety of an entire road.

In an embodiment, the first indication information further indicates a driving automation level of the automated driving function application. The driving automation level information is indicated, so that the surrounding traffic participant can more accurately learn of specific automated driving information, to help improve safety. For example, the surrounding traffic participant may learn, by indicating the driving automation level information, at least one piece of information such as whether the automated driving function application being executed or to be executed by the first vehicle can continuously execute all dynamic driving tasks, whether the minimal risk condition can be automatically reached, and whether there is a limitation on an operational design domain. In this way, the surrounding traffic participant may perform, based on the driving automation level information of the first vehicle, corresponding actions such as whether courtesy is required and whether a distance needs to be maintained. This helps improve road safety.

In an embodiment, the driving automation level is a level in a driving automation level set, and the driving automation level set includes at least one or more of a first level, a second level, and a third level, and the first level is conditional driving automation (Conditional Automation); the second level is high driving automation (High Automation); and the third level is full driving automation (Full Automation). More specific level information is obtained by dividing driving automation, so that a traffic participant in a surrounding environment has a more intuitive understanding of an automated driving state of an automated driving vehicle driving on a road, to help improve safety.

In an embodiment, the first vehicle indicates, by using second indication information, a fallback-ready user status corresponding to the first vehicle. By indicating the information about the fallback-ready user status, when the automated driving vehicle is driven on the road, the surrounding traffic participant can more accurately learn of the fallback-ready user status corresponding to the first vehicle in the automated driving state, to improve road safety. For example, the surrounding traffic participant may more accurately learn of the fallback-ready user status corresponding to the first vehicle in the automated driving state, and/or a capability of the fallback-ready user to take over an automated driving system (switch from the automated driving state to a manual driving state). For example, when an emergency occurs, whether the fallback-ready user is capable of taking over the emergency and how fast a response speed is to ensure traffic safety.

In an embodiment, that the first vehicle indicates, by using second indication information, a fallback-ready user status corresponding to the first vehicle includes: the second indication information may indicate whether there is a fallback-ready user corresponding to the first vehicle. Whether there is the fallback-ready user corresponding to the first vehicle is indicated, to improve road safety. For example, the surrounding traffic participant may learn whether a fallback-ready user can timely take over the automated driving system (switch from the automated driving state to the manual driving state) when an emergency occurs.

In an embodiment, the first vehicle sends a second message, and the second message includes third indication information used to indicate a capability of the first vehicle. The indication information including the capability of the first vehicle is sent, so that the surrounding participant can accurately determine a work margin of each module of the first vehicle in the automated driving state, to improve safety. For example, the surrounding traffic participant learns, by using the second message, that the automated driving system of the first vehicle loses the horizontal control capability (a steering capability) of the vehicle. In this way, the surrounding traffic participant may perform emergency rescue or assistance on the first vehicle, facilitate or help the first vehicle to pass through, or avoid the automated driving vehicle, to improve road safety.

In an embodiment, the first vehicle sends the second message, and the second message further includes fourth indication information used to indicate the automated driving function application and/or fifth indication information used to indicate an operational design domain corresponding to the automated driving function application. In this implementation, the surrounding traffic participant can accurately determine an operational design domain corresponding to an automated driving function application being executed or to be executed by a vehicle in the automated driving state and/or an automated driving function application, to improve safety. For example, the surrounding traffic participant may determine a complexity degree of a function application of the first vehicle based on the automated driving function application and the corresponding operational design domain, to determine a risk degree of the function application of the first vehicle. Alternatively, the surrounding traffic participant may determine, based on the operational design domain included in the second message, whether the function application of the first vehicle is outside the operational design domain, to determine a status of the first vehicle (for example, an abnormal or faulty state). In this case, the surrounding traffic participant may perform emergency rescue or assistance on the first vehicle, facilitate or help the first vehicle to pass through, or avoid the automated driving vehicle, to help improve road safety.

In an embodiment, the first message further includes second indication information, and the second indication information indicates a fallback-ready user status corresponding to the first vehicle. The indication information of the fallback-ready user status corresponding to the first vehicle is sent to another device (for example, a cloud server, a roadside device, or a second vehicle) through message transmission, to improve road safety. For example, the roadside device, the cloud server, or the second vehicle more accurately learns, by obtaining the second indication information, the fallback-ready user status corresponding to the first vehicle in the automated driving state and/or the capability of the fallback-ready user to take over the automated driving system (switch from the automated driving state to the manual driving state). For example, when an emergency occurs, whether the fallback-ready user is capable of taking over the emergency and how fast a response speed is to ensure traffic safety. For another example, the fallback-ready user is woken up under a condition (for example, a driver is asleep under an L3 conditional driving automation level), to improve road safety.

In an embodiment, that the first vehicle indicates, by using second indication information, a fallback-ready user status corresponding to the first vehicle includes: the second indication information may indicate whether there is a fallback-ready user corresponding to the first vehicle. Whether there is the fallback-ready user corresponding to the first vehicle is sent to another device (for example, the cloud server, the roadside device, or the second vehicle) through message transmission, to improve road safety. For example, the cloud server, the roadside device, or the second vehicle may learn whether a fallback-ready user can timely take over the automated driving system (switch from the automated driving state to the manual driving state) when an emergency occurs.

In an embodiment, the first message further includes third indication information used to indicate a capability of the first vehicle. It may be understood that the third indication information used to indicate the capability of the first vehicle may be included in the first message, or may be included in the second message. This is not limited in this embodiment of this application. For example, the third indication information used to indicate the capability of the first vehicle may be included in the first message.

In an embodiment, the capability includes at least one of the following: a current sensing capability, a current horizontal control capability, a current vertical control capability, a minimal risk condition that can be currently reached, a maximum sensing capability of a system, a maximum horizontal control capability of the system, a maximum vertical control capability of the system, or a minimal risk condition that can be currently reached by the system.

In an embodiment, the first message further includes fourth indication information used to indicate the automated driving function application and/or fifth indication information used to indicate an operational design domain corresponding to the automated driving function application. It may be understood that the fourth indication information used to indicate the automated driving function application and/or the fifth indication information used to indicate the operational design domain corresponding to the automated driving function application may be included in the first message, or may be included in the second message. This is not limited in this embodiment of this application. For example, the fourth indication information used to indicate the automated driving function application and/or the fifth indication information used to indicate the operational design domain corresponding to the automated driving function application are/is included in the first message.

In an embodiment, the first indication information includes at least one of the following: an identifier disposed on a body of the first vehicle, a preset sound signal sent by the first vehicle, a preset light signal sent by the first vehicle, a preset light color signal sent by the first vehicle, or a preset electromagnetic wave signal sent by the first vehicle. In this implementation, the first indication information may be indicated in a more flexible manner, so that the traffic participant can more accurately determine that the driving status of the first vehicle is the automated driving state.

In an embodiment, light signals of different colors are used to indicate different driving automation levels. In this implementation, indication information indicating different driving automation levels can be more accurate and clear.

According to a second aspect, an embodiment of this application provides a method for obtaining automated driving information, where the method includes: obtaining first indication information, where the first indication information is used to indicate that a driving status of a first vehicle is an automated driving state; and determining, based on the first indication information, that a current driving status of the first vehicle is the automated driving state.

In the foregoing manner, an information obtaining object (for example, a surrounding traffic participant, a roadside device, or an electronic apparatus) identifies, based on the indication information of the first vehicle or a sent message, that the driving status of the first vehicle is the automated driving state, to attract attention of the information obtaining object and improve traffic safety of an entire road.

In an embodiment, the first indication information further indicates a driving automation level of an automated driving function application. The information obtaining object can more accurately learn specific automated driving information by obtaining driving automation level information, to help improve safety. For example, the surrounding traffic participant may learn, by indicating the driving automation level information, at least one piece of information such as whether the automated driving function application being executed or to be executed by the first vehicle can continuously execute all dynamic driving tasks, whether the minimal risk condition can be automatically reached, and whether there is a limitation on an operational design domain. In this way, the surrounding traffic participant may perform, based on the driving automation level information of the first vehicle, corresponding actions such as whether courtesy is required and whether a distance needs to be maintained. This helps improve road safety.

In an embodiment, the driving automation level is a level in a driving automation level set, and the driving automation level set includes at least one or more of a first level, a second level, and a third level, and the first level is conditional driving automation (Conditional Automation); the second level is high driving automation (High Automation); and the third level is full driving automation (Full Automation). More specific level information is obtained by dividing driving automation, so that the surrounding traffic participant has a more intuitive understanding of an automated driving state of an automated driving vehicle driving on a road, to help improve safety.

In an embodiment, the method for obtaining automated driving information further includes: obtaining at least one piece of the following indication information: second indication information, where the second indication information is used to indicate a fallback-ready user status corresponding to the first vehicle; third indication information, where the third indication information is used to indicate a capability of the first vehicle; fourth indication information, where the fourth indication information is used to indicate the automated driving function application being executed or to be executed by the first vehicle; and fifth indication information, where the fifth indication information is used to indicate an operational design domain corresponding to the automated driving function application being executed or to be executed by the first vehicle. The surrounding environment participant can more accurately learn of various types of automated driving information corresponding to a vehicle in the automated driving state by obtaining at least one piece of the first indication information, the second indication information, the third indication information, the fourth indication information, or the fifth indication information, to further improve safety.

In an embodiment, the capability includes at least one of the following: a current sensing capability, a current horizontal control capability, a current vertical control capability, a minimal risk condition that can be currently reached, a maximum sensing capability of a system, a maximum horizontal control capability of the system, a maximum vertical control capability of the system, or a minimal risk condition that can be currently reached by the system.

According to a third aspect, an embodiment of this application provides a method for sending automated driving information, where the method includes: sending a third message, where the third message includes sixth indication information, and the sixth indication information indicates that a driving status of a first vehicle is an automated driving state. In the foregoing manner, an information obtaining object (for example, a surrounding traffic participant, a roadside device, or an electronic apparatus) may identify, based on the indication information of the first vehicle or the sent message, that the driving status of the first vehicle is the automated driving state, to attract attention of the information obtaining object and improve traffic safety of an entire road.

In an embodiment, the sixth indication information further indicates a driving automation level of an automated driving function application being executed or to be executed by the first vehicle. The information obtaining object can more accurately learn specific automated driving information by obtaining driving automation level information, to help improve safety. For example, the surrounding traffic participant may learn, by indicating the driving automation level information, at least one piece of information such as whether the automated driving function application being executed or to be executed by the first vehicle can continuously execute all dynamic driving tasks, whether the minimal risk condition can be automatically reached, and whether there is a limitation on an operational design domain. In this way, the surrounding traffic participant may perform, based on the driving automation level information of the first vehicle, corresponding actions such as whether courtesy is required and whether a distance needs to be maintained. This helps improve road safety.

In an embodiment, the driving automation level is a level in a driving automation level set, and the driving automation level set includes at least one or more of a first level, a second level, and a third level, and the first level is conditional driving automation (Conditional Automation); the second level is high driving automation (High Automation); and the third level is full driving automation (Full Automation). More specific level information is obtained by dividing driving automation, so that the surrounding traffic participant has a more intuitive understanding of an automated driving state of an automated driving vehicle driving on a road, to help improve safety.

In an embodiment, a fourth message is sent, where the fourth message includes seventh indication information used to indicate a capability of the first vehicle. The indication information including the capability of the first vehicle is sent, so that the surrounding participant can accurately determine a work margin of each module of the first vehicle in the automated driving state, to improve safety. For example, the surrounding traffic participant learns, by using the fourth message, that an automated driving system of the first vehicle loses the horizontal control capability (a steering capability) of the vehicle. In this way, the surrounding traffic participant may perform emergency rescue or assistance on the first vehicle, facilitate or help the first vehicle to pass through, or avoid the automated driving vehicle, to improve road safety.

In an embodiment, the fourth message is sent, where the fourth message further includes eighth indication information used to indicate the automated driving function application and/or ninth indication information used to indicate an operational design domain corresponding to the automated driving function application.

In this implementation, the surrounding traffic participant can accurately determine an operational design domain corresponding to an automated driving function application being executed or to be executed by a vehicle in the automated driving state and/or an automated driving function application, to improve safety. For example, the surrounding traffic participant may determine a complexity degree of a function application of the first vehicle based on the automated driving function application and the corresponding operational design domain, to determine a risk degree of the function application of the first vehicle. Alternatively, the surrounding traffic participant may determine, based on the operational design domain included in the fourth message, whether the function application of the first vehicle is outside the operational design domain, to determine a status of the first vehicle (for example, an abnormal or faulty state). In this case, the surrounding traffic participant may perform emergency rescue or assistance on the first vehicle, facilitate or help the first vehicle to pass through, or avoid the automated driving vehicle, to help improve road safety.

In an embodiment, the third message further includes tenth indication information, and the tenth indication information indicates a fallback-ready user status corresponding to the first vehicle. By sending the information about the fallback-ready user status, when the automated driving vehicle is driven on the road, the surrounding traffic participant can more accurately learn of the fallback-ready user status corresponding to the first vehicle in the automated driving state, to improve road safety. For example, the surrounding traffic participant may more accurately learn of the fallback-ready user status corresponding to the first vehicle in the automated driving state, and/or a capability of the fallback-ready user to take over the automated driving system (switch from the automated driving state to a manual driving state). For example, when an emergency occurs, whether the fallback-ready user is capable of taking over the emergency and how fast a response speed is to ensure traffic safety.

In an embodiment, that the tenth indication information indicates a fallback-ready user status corresponding to the first vehicle includes: the tenth indication information may indicate whether there is a fallback-ready user corresponding to the first vehicle. Whether there is the fallback-ready user corresponding to the first vehicle is indicated, to improve road safety. For example, the surrounding traffic participant may learn whether a fallback-ready user can timely take over the automated driving system (switch from the automated driving state to the manual driving state) when an emergency occurs.

In an embodiment, the third message further includes seventh indication information used to indicate a capability of the first vehicle. It may be understood that the seventh indication information used to indicate the capability of the first vehicle may be included in the third message, or may be included in the fourth message. This is not limited in this embodiment of this application. For example, the seventh indication information used to indicate the capability of the first vehicle may be included in the third message.

In an embodiment, the capability includes at least one of the following: a current sensing capability, a current horizontal control capability, a current vertical control capability, a minimal risk condition that can be currently reached, a maximum sensing capability of a system, a maximum horizontal control capability of the system, a maximum vertical control capability of the system, or a minimal risk condition that can be currently reached by the system.

In an embodiment, the third message further includes eighth indication information used to indicate the automated driving function application and/or ninth indication information used to indicate an operational design domain corresponding to the automated driving function application. It may be understood that the eighth indication information used to indicate the automated driving function application and/or the ninth indication information used to indicate the operational design domain corresponding to the automated driving function application may be included in the third message, or may be included in the fourth message. This is not limited in this embodiment of this application. For example, the eighth indication information used to indicate the automated driving function application and/or the ninth indication information used to indicate the operational design domain corresponding to the automated driving function application are/is included in the third message.

In an embodiment, the third message further includes eleventh indication information used for confidence of at least one piece of indication information in the third message or comprehensive confidence of all pieces of indication information included in the third message. Confidence of each piece of indication information or the comprehensive confidence of all pieces of indication information is set, so that the surrounding environment participant can more accurately identify whether a current driving status of the first vehicle is the automated driving state.

In an embodiment, the fourth message further includes twelfth indication information used for confidence of at least one piece of indication information in the fourth message or comprehensive confidence of all pieces of indication information included in the fourth message. Confidence of each piece of indication information or the comprehensive confidence of all pieces of indication information is set, so that the surrounding environment participant can more accurately identify whether a current driving status of the first vehicle is the automated driving state.

According to a fourth aspect, an embodiment of this application provides an apparatus for indicating automated driving information, applied to a first vehicle, where the apparatus for indicating automated driving information includes: a starting unit, configured to start an automated driving function application, or receive an instruction used to instruct the first vehicle to start an automated driving function application; and an indication unit, configured to indicate, by using first indication information, that a driving status of the first vehicle is an automated driving state.

The apparatus for indicating automated driving information provided in this application further includes a first sending unit, configured to send a first message, where the first message includes first indication information, and the first indication information indicates that a driving status of the first vehicle is an automated driving state.

The first vehicle may send the first message to a roadside device, a pedestrian, or the like disposed around a road (for example, on one side of the road or on two sides of the road), or may send the first message to a second vehicle around the first vehicle.

In an embodiment, the first indication information further indicates a driving automation level of the automated driving function application. Driving automation level information is indicated, to help improve safety. For example, the surrounding traffic participant may learn, by indicating the driving automation level information, at least one piece of information such as whether the automated driving function application being executed or to be executed by the first vehicle can continuously execute all dynamic driving tasks, whether the minimal risk condition can be automatically reached, and whether there is a limitation on an operational design domain. In this way, the surrounding traffic participant may perform, based on the driving automation level information of the first vehicle, corresponding actions such as whether courtesy is required and whether a distance needs to be maintained. This helps improve road safety.

In an embodiment, the driving automation level is a level in a driving automation level set, and the driving automation level set includes at least one or more of a first level, a second level, and a third level, and the first level is conditional driving automation (Conditional Automation); the second level is high driving automation (High Automation); and the third level is full driving automation (Full Automation). More specific level information is obtained by dividing driving automation, so that a traffic participant in a surrounding environment has a more intuitive understanding of an automated driving state of an automated driving vehicle driving on a road, to help improve safety.

In an embodiment, the first vehicle indicates, by using second indication information, a fallback-ready user status corresponding to the first vehicle. By using the information indicating the fallback-ready user status, when the automated driving vehicle is driven on the road, the surrounding traffic participant can more accurately learn of the fallback-ready user status in the automated driving state, to improve road safety. For example, the surrounding traffic participant may more accurately learn of the fallback-ready user status corresponding to the first vehicle in the automated driving state, and/or a capability of the fallback-ready user to take over an automated driving system (switch from the automated driving state to a manual driving state). For example, when an emergency occurs, whether the fallback-ready user is capable of taking over the emergency and how fast a response speed is to ensure traffic safety.

In an embodiment, that the first vehicle indicates, by using second indication information, a fallback-ready user status corresponding to the first vehicle includes: the second indication information may indicate whether there is a fallback-ready user corresponding to the first vehicle. Whether there is the fallback-ready user corresponding to the first vehicle is indicated, to improve road safety. For example, the surrounding traffic participant may learn whether a fallback-ready user can timely take over the automated driving system (switch from the automated driving state to the manual driving state) when an emergency occurs.

In an embodiment, the apparatus for indicating automated driving information further includes a second sending unit, configured to send a second message, where the second message includes third indication information used to indicate a capability of the first vehicle. The indication information including the capability of the first vehicle is sent, so that the surrounding participant can accurately determine a work margin of each module of the first vehicle in the automated driving state, to improve safety. For example, the surrounding traffic participant learns, by using the second message, that the automated driving system of the first vehicle loses the horizontal control capability (a steering capability) of the vehicle. In this way, the surrounding traffic participant may perform emergency rescue or assistance on the first vehicle, facilitate or help the first vehicle to pass through, or avoid the automated driving vehicle, to improve road safety.

In an embodiment, the apparatus for indicating automated driving information further includes the second sending unit, configured to send the second message, where the second message further includes fourth indication information used to indicate the automated driving function application and/or fifth indication information used to indicate an operational design domain corresponding to the automated driving function application. In this implementation, the surrounding traffic participant can accurately determine an operational design domain corresponding to an automated driving function application being executed or to be executed by a vehicle in the automated driving state and/or an automated driving function application, to improve safety. For example, the surrounding traffic participant may determine a complexity degree of a function application of the first vehicle based on the automated driving function application and the corresponding operational design domain, to determine a risk degree of the function application of the first vehicle. Alternatively, the surrounding traffic participant may determine, based on the operational design domain included in the second message, whether the function application of the first vehicle is outside the operational design domain, to determine a status of the first vehicle (for example, an abnormal or faulty state). In this case, the surrounding traffic participant may perform emergency rescue or assistance on the first vehicle, facilitate or help the first vehicle to pass through, or avoid the automated driving vehicle, to help improve road safety.

In an embodiment, the first message further includes second indication information, and the second indication information indicates a fallback-ready user status corresponding to the first vehicle. The indication information of the fallback-ready user status corresponding to the first vehicle is sent to another apparatus (for example, a cloud server, a roadside device, or a second vehicle) through message transmission, to improve road safety. For example, the cloud server, the roadside device, or the second vehicle more accurately learns, by obtaining the second indication information, the fallback-ready user status corresponding to the first vehicle in the automated driving state and/or the capability of the fallback-ready user to take over the automated driving system (switch from the automated driving state to the manual driving state). For example, when an emergency occurs, whether the fallback-ready user is capable of taking over the emergency and how fast a response speed is to ensure traffic safety. For another example, the fallback-ready user is woken up under a condition (for example, a driver is asleep under an L3 conditional driving automation level), to improve road safety.

In an embodiment, that the first vehicle indicates, by using second indication information, a fallback-ready user status corresponding to the first vehicle includes: the second indication information may indicate whether there is a fallback-ready user corresponding to the first vehicle. Whether there is the fallback-ready user corresponding to the first vehicle is sent to another device (for example, the cloud server, the roadside device, or the second vehicle) through message transmission, to improve road safety. For example, the cloud server, the roadside device, or the second vehicle may learn whether a fallback-ready user can timely take over the automated driving system (switch from the automated driving state to the manual driving state) when an emergency occurs.

In an embodiment, the first message further includes third indication information used to indicate a capability of the first vehicle. It may be understood that the third indication information used to indicate the capability of the first vehicle may be included in the first message, or may be included in the second message. This is not limited in this embodiment of this application. For example, the third indication information used to indicate the capability of the first vehicle may be included in the first message.

In an embodiment, the capability includes at least one of the following: a current sensing capability, a current horizontal control capability, a current vertical control capability, a minimal risk condition that can be currently reached, a maximum sensing capability of a system, a maximum horizontal control capability of the system, a maximum vertical control capability of the system, or a minimal risk condition that can be currently reached by the system.

In an embodiment, the first message further includes fourth indication information used to indicate the automated driving function application and/or fifth indication information used to indicate an operational design domain corresponding to the automated driving function application. It may be understood that the fourth indication information used to indicate the automated driving function application and/or the fifth indication information used to indicate the operational design domain corresponding to the automated driving function application may be included in the first message, or may be included in the second message. This is not limited in this embodiment of this application. For example, the fourth indication information used to indicate the automated driving function application and/or the fifth indication information used to indicate the operational design domain corresponding to the automated driving function application are/is included in the first message.

In an embodiment, the first indication information includes at least one of the following: an identifier disposed on a body of the first vehicle, a preset sound signal sent by the first vehicle, a preset light signal sent by the first vehicle, a preset light color signal sent by the first vehicle, or a preset electromagnetic wave signal sent by the first vehicle. In this implementation, the first indication information may be indicated in a more flexible manner, so that the traffic participant can more accurately determine that the driving status of the first vehicle is the automated driving state.

In an embodiment, light signals of different colors are used to indicate different driving automation levels. In this implementation, indication information indicating different driving automation levels can be more accurate and clear.

According to a fifth aspect, an embodiment of this application provides an apparatus for obtaining automated driving information, where the apparatus for obtaining automated driving information includes: a first obtaining unit, configured to obtain first indication information, where the first indication information is used to indicate that a driving status of a first vehicle is an automated driving state; and a determining unit, configured to determine, based on the first indication information, that a current driving status of the first vehicle is the automated driving state.

In an embodiment, the driving automation level is a level in a driving automation level set, and the driving automation level set includes at least one or more of a first level, a second level, and a third level, and the first level is conditional driving automation (Conditional Automation); the second level is high driving automation (High Automation); and the third level is full driving automation (Full Automation). More specific level information is obtained by dividing driving automation, so that the surrounding traffic participant has a more intuitive understanding of an automated driving state of an automated driving vehicle driving on a road, to help improve safety.

In an embodiment, the apparatus for obtaining automated driving information further includes: a second obtaining unit, configured to obtain at least one piece of the following indication information: second indication information, where the second indication information is used to indicate a fallback-ready user status corresponding to the first vehicle; third indication information, where the third indication information is used to indicate a capability of the first vehicle; fourth indication information, where the fourth indication information is used to indicate the automated driving function application being executed or to be executed by the first vehicle; and fifth indication information, where the fifth indication information is used to indicate an operational design domain corresponding to the automated driving function application being executed or to be executed by the first vehicle. The surrounding environment participant can more accurately learn of various types of automated driving information corresponding to a vehicle in the automated driving state by obtaining at least one piece of the first indication information, the second indication information, the third indication information, the fourth indication information, or the fifth indication information, to further improve safety.

In an embodiment, the capability includes at least one of the following: a current sensing capability, a current horizontal control capability, a current vertical control capability, a minimal risk condition that can be currently reached, a maximum sensing capability of a system, a maximum horizontal control capability of the system, a maximum vertical control capability of the system, or a minimal risk condition that can be currently reached by the system.

According to a sixth aspect, an embodiment of this application provides an apparatus for sending automated driving information, where the apparatus for sending automated driving information includes: a first sending unit, configured to send a third message, where the third message includes sixth indication information, and the sixth indication information indicates that a driving status of a first vehicle is an automated driving state.

In an embodiment, the sixth indication information further indicates a driving automation level of an automated driving function application being executed or to be executed by the first vehicle. The information obtaining object can more accurately learn specific automated driving information by obtaining driving automation level information, to help improve safety. For example, the surrounding traffic participant may learn, by indicating the driving automation level information, at least one piece of information such as whether the automated driving function application being executed or to be executed by the first vehicle can continuously execute all dynamic driving tasks, whether the minimal risk condition can be automatically reached, and whether there is a limitation on an operational design domain. In this way, the surrounding traffic participant may perform, based on the driving automation level information of the first vehicle, corresponding actions such as whether courtesy is required and whether a distance needs to be maintained. This helps improve road safety.

In an embodiment, the driving automation level is a level in a driving automation level set, and the driving automation level set includes at least one or more of a first level, a second level, and a third level, and the first level is conditional driving automation (Conditional Automation); the second level is high driving automation (High Automation); and the third level is full driving automation (Full Automation). More specific level information is obtained by dividing driving automation, so that the surrounding traffic participant has a more intuitive understanding of an automated driving state of an automated driving vehicle driving on a road, to help improve safety.

In an embodiment, the apparatus for sending automated driving information further includes a second sending unit, configured to send a fourth message, where the fourth message includes seventh indication information used to indicate a capability of the first vehicle. The indication information including the capability of the first vehicle is sent, so that the surrounding participant can accurately determine a work margin of each module of the first vehicle in the automated driving state, to improve safety. For example, the surrounding traffic participant learns, by using the fourth message, that an automated driving system of the first vehicle loses the horizontal control capability (a steering capability) of the vehicle. In this way, the surrounding traffic participant may perform emergency rescue or assistance on the first vehicle, facilitate or help the first vehicle to pass through, or avoid the automated driving vehicle, to improve road safety.

In an embodiment, the apparatus for sending automated driving information further includes the second sending unit, configured to send the fourth message, where the fourth message further includes eighth indication information used to indicate the automated driving function application and/or ninth indication information used to indicate an operational design domain corresponding to the automated driving function application. In this implementation, the surrounding traffic participant can accurately determine an operational design domain corresponding to an automated driving function application being executed or to be executed by a vehicle in the automated driving state and/or an automated driving function application, to improve safety. For example, the surrounding traffic participant may determine a complexity degree of a function application of the first vehicle based on the automated driving function application and the corresponding operational design domain, to determine a risk degree of the function application of the first vehicle. Alternatively, the surrounding traffic participant may determine, based on the operational design domain included in the fourth message, whether the function application of the first vehicle is outside the operational design domain, to determine a status of the first vehicle (for example, an abnormal or faulty state). In this case, the surrounding traffic participant may perform emergency rescue or assistance on the first vehicle, facilitate or help the first vehicle to pass through, or avoid the automated driving vehicle, to help improve road safety.

In an embodiment, the third message further includes tenth indication information, and the tenth indication information indicates a fallback-ready user status corresponding to the first vehicle.

By sending the information about the fallback-ready user status, when the automated driving vehicle is driven on the road, the surrounding traffic participant can more accurately learn of the fallback-ready user status corresponding to the first vehicle in the automated driving state, to improve road safety. For example, the surrounding traffic participant may more accurately learn of the fallback-ready user status corresponding to the first vehicle in the automated driving state, and/or a capability of the fallback-ready user to take over an automated driving system (switch from the automated driving state to a manual driving state). For example, when an emergency occurs, whether the fallback-ready user is capable of taking over the emergency and how fast a response speed is to ensure traffic safety.

In an embodiment, that the tenth indication information indicates a fallback-ready user status corresponding to the first vehicle includes: the tenth indication information may indicate whether there is a fallback-ready user corresponding to the first vehicle. Whether there is the fallback-ready user corresponding to the first vehicle is indicated, to improve road safety. For example, the surrounding traffic participant may learn whether a fallback-ready user can timely take over the automated driving system (switch from the automated driving state to the manual driving state) when an emergency occurs.

In an embodiment, the third message further includes seventh indication information used to indicate a capability of the first vehicle. It may be understood that the seventh indication information used to indicate the capability of the first vehicle may be included in the third message, or may be included in the fourth message. This is not limited in this embodiment of this application. For example, the seventh indication information used to indicate the capability of the first vehicle may be included in the third message.

In an embodiment, the capability includes at least one of the following: a current sensing capability, a current horizontal control capability, a current vertical control capability, a minimal risk condition that can be currently reached, a maximum sensing capability of a system, a maximum horizontal control capability of the system, a maximum vertical control capability of the system, or a minimal risk condition that can be currently reached by the system.

In an embodiment, the third message further includes eighth indication information used to indicate the automated driving function application and/or ninth indication information used to indicate an operational design domain corresponding to the automated driving function application. It may be understood that the eighth indication information used to indicate the automated driving function application and/or the ninth indication information used to indicate the operational design domain corresponding to the automated driving function application may be included in the third message, or may be included in the fourth message. This is not limited in this embodiment of this application. For example, the eighth indication information used to indicate the automated driving function application and/or the ninth indication information used to indicate the operational design domain corresponding to the automated driving function application are/is included in the third message.

In an embodiment, the third message further includes eleventh indication information used for confidence of at least one piece of indication information in the third message or comprehensive confidence of all pieces of indication information included in the third message. Confidence of each piece of indication information or the comprehensive confidence of all pieces of indication information is set, so that the surrounding environment participant can more accurately identify whether a current driving status of the first vehicle is the automated driving state.

In an embodiment, the fourth message further includes twelfth indication information used for confidence of at least one piece of indication information in the fourth message or comprehensive confidence of all pieces of indication information included in the fourth message. Confidence of each piece of indication information or the comprehensive confidence of all pieces of indication information is set, so that the surrounding environment participant can more accurately identify whether a current driving status of the first vehicle is the automated driving state.

According to a seventh aspect, an embodiment of this application further provides a system for sending/receiving automated driving information, where the system for sending/receiving automated driving information includes a first vehicle and a first information receiving object. The first vehicle includes the apparatus for indicating automated driving information according to the fourth aspect. The first information receiving object includes the apparatus for obtaining automated driving information according to the fifth aspect.

In an embodiment, the system for sending/receiving automated driving information further includes a second information receiving object. The second information receiving object includes the apparatus for obtaining automated driving information according to the fifth aspect, and further includes the apparatus for sending automated driving information according to the sixth aspect.

According to an eighth aspect, an embodiment of this application provides a computer-readable storage medium, where the computer-readable storage medium stores program code used for message transmission. The program code includes an instruction used to perform the methods described in the first aspect to the third aspect.

BRIEF DESCRIPTION OF DRAWINGS

To describe the technical solutions in the embodiments of this application more clearly, the following briefly describes the accompanying drawings for describing the embodiments of this application. Apparently, the accompanying drawings in the following description show merely some embodiments of this application, and a person of ordinary skill in the art may derive other drawings from these accompanying drawings without creative efforts.

DESCRIPTION OF EMBODIMENTS

The following clearly and completely describes the technical solutions in the embodiments of this application with reference to the accompanying drawings in the embodiments of this application. Apparently, the described embodiments are some but not all of the embodiments of this application. All other embodiments obtained by a person of ordinary skill in the art based on the embodiments of this application without creative efforts shall fall within the protection scope of this application.

The term "and/or" in this specification describes only an association relationship for describing associated objects and represents that three relationships may exist. For example, A and/or B may represent the following three cases: Only A exists, both A and B exist, and only B exists.

In the specification and claims in the embodiments of this application, the terms "first", "second", and so on are intended to distinguish between different objects but do not indicate a particular order of the objects. For example, a first target object, a second target object, and the like are used to distinguish between different target objects, but are not used to describe a specific order of the target objects.

In addition, in the embodiments of this application, the word "example" or "for example" is used to represent giving an example, an illustration, or a description. Any embodiment or design scheme described as an "example" or "for example" in the embodiments of this application should not be explained as being more preferred or having more advantages than another embodiment or design scheme. Exactly, use of the word "example" or "for example" or the like is intended to present a relative concept in a specific manner.

In the description of the embodiment of this application, unless otherwise stated, "a plurality of" means two or more than two. For example, a plurality of processing units are two or more processing units. A plurality of systems are two or more systems.

In an existing automated driving technology, a capability of performing a dynamic driving task and processing an emergency by an automated driving vehicle is far lower than a capability of a fallback-ready user. In addition, when the automated driving vehicle is driven on a road, another traffic participant usually cannot perceive the automated driving vehicle. Consequently, there is a safety hazard when the automated driving vehicle is driven on the road.

Figure 1:
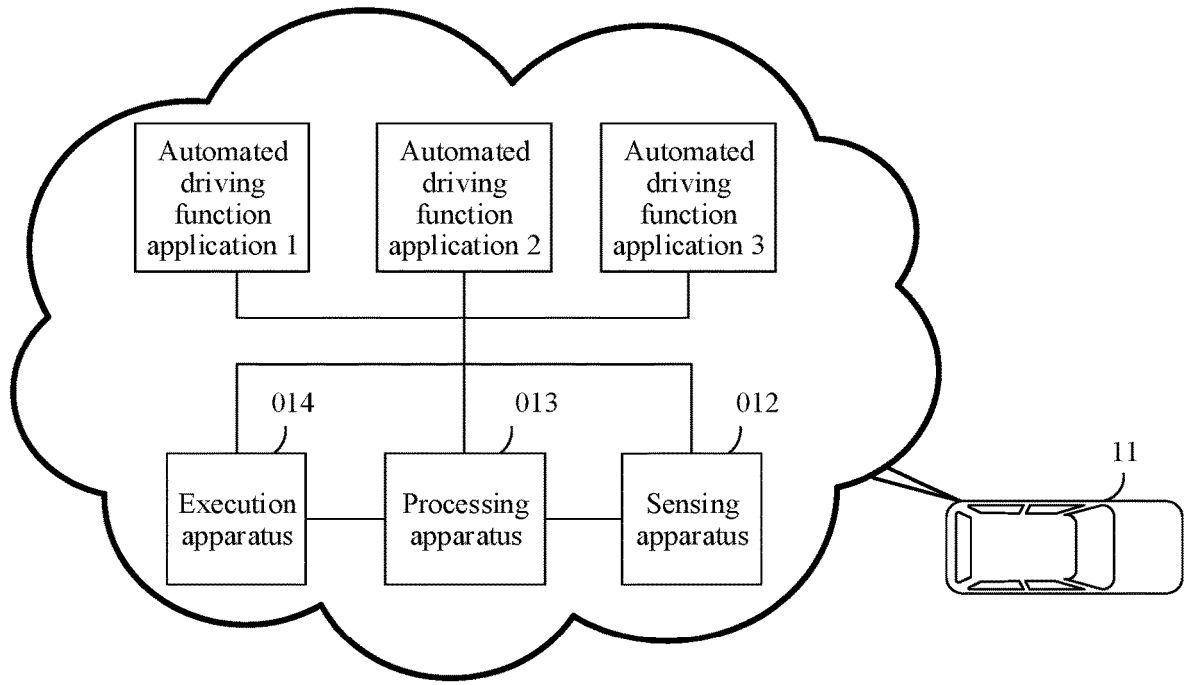
FIG. 1 is a schematic diagram of a structure of a vehicle according to an embodiment of this application.

To resolve the foregoing problem, refer to FIG. 1. FIG. 1 is a schematic diagram of a structure of a vehicle according to an embodiment of this application. The schematic diagram of the structure of the vehicle shown in FIG. 1 includes a vehicle 11 and various devices, components, and the like disposed in the vehicle 11 and/or a body of the vehicle 11. Herein, the device and the component that are disposed in the vehicle 11 may include but are not limited to an automated driving system and an automated driving function application. Herein, the automated driving system is usually disposed in a vehicle that has at least a specific automated driving capability.

In a narrow sense, the automated driving system is a system that includes hardware and software and that can continuously perform all dynamic driving tasks, regardless of whether there is a limitation on an operational design domain (The hardware and software that are collectively capable of performing the entire DDT on a sustained basis, regardless of whether it is limited to a specific operational design domain (ODD)).

In a broad sense, the automated driving system is a system that includes hardware and software and that can continuously execute some or all (entire) dynamic driving tasks.

The dynamic driving task is to complete sensing, decision-making, and execution used for vehicle driving. The dynamic driving task includes all real-time operational and tactical functions when a road vehicle is driven, and a strategic function is not included, for example, itinerary planning, destination and route selection (All of the real-time operational and tactical functions used to operate a vehicle in on-road traffic, excluding the strategic functions such as trip scheduling and selection of destinations and waypoints). For example, the dynamic driving task includes but is not limited to the following subtasks: lateral vehicle motion control (Lateral vehicle motion control via steering (operational)), longitudinal vehicle motion control (Longitudinal vehicle motion control via acceleration and deceleration (operational)), monitoring a driving environment via object and event detection, recognition, classification, and response preparation (Monitoring the driving environment via object and event detection, recognition, classification, and response preparation (operational and tactical)), object and event response execution (Object and event response execution (operational and tactical)), maneuver planning (tactical), and vehicle lighting and signal device control (Enhancing conspicuity via lighting, sounding the horn, signaling, gesturing, etc. (tactical))

Usually, when an operational design domain (ODD) is exceeded or a system related to the dynamic driving task fails, an automated driving state needs to be switched to a manual driving state, and a person continues to perform the dynamic driving task, or the vehicle is controlled by a person to reach a minimal safe state. Of course, L4 and above driving automation systems can automatically reach the minimal safe state.

A fallback-ready user corresponding to a first vehicle refers to a person responsible for taking over (switching from the automated driving state to the manual driving state) the first vehicle. The person responsible for takeover may be a fallback-ready user inside the first vehicle, or may be a fallback-ready user outside the first vehicle, for example, a remote fallback-ready user. The remote fallback-ready user may take over the vehicle by using a remote instruction, to perform the dynamic driving task, or enable the vehicle to reach a minimal risk condition. When the fallback-ready user takes over the vehicle, the fallback-ready user becomes a driver of the vehicle.

The automated driving system in a narrow sense corresponds to a system whose driving automation level is L3 to L5. The automated driving system in a broad sense corresponds to a system whose driving automation level is L1 to L5.

The automated driving system usually includes a sensing system, a decision-making system, and an execution system. Usually, the automated driving system may be disposed in the vehicle 11, and senses an environment inside the vehicle and an environment outside the vehicle through the sensing system. Decisions such as path planning are made through the decision-making system, and movement of the vehicle 11 is controlled through execution system. Usually, automated driving performs a corresponding driving automation function based on some received instruction information.

Herein, the automated driving function application is also referred to as an automated driving application or a feature, and is an automated driving subsystem configured to perform a specific function. The specific function may include, for example, but is not limited to: cruise control, automated valet parking, low-speed automated driving of a fixed route, and lane keeping. The specific function may have a limitation on the operational design domain, or may have no limitation on the operational design domain. The automated driving system may have one or more automated driving function applications. Usually, a single automated driving function application has a separate specification. Usually, after being started or after receiving a start instruction, the automated driving function application may control the vehicle 11 to perform some or all dynamic driving tasks.

In the schematic diagram of the structure of the vehicle shown in FIG. 1, the vehicle 11 may include an automated driving function application 1 to an automated driving function application 3. Each automated driving function application 1, the automated driving function application 2, and the automated driving function application 3 may execute a specific automated driving function. Each specific automated driving function may include a plurality of sub-functions. In an example, the automated driving function application 1 may perform a cruise control function. The automated driving function application 2 may perform the cruise control function and a lane keeping function at the same time. For example, the automated driving function application 1 to the automated driving function application 3 may include a sensing apparatus 012, a processing apparatus 013, and a vehicle execution apparatus 014 that are sequentially connected. Optionally, the sensing apparatus 012 may include at least one of a plurality of sensors such as a camera, a radar, a gyroscope, and an accelerometer. The processing apparatus 013 may be an apparatus that integrates an image processing function, a scalar calculation function, a vector calculation function, and a matrix calculation function. The execution apparatus 014 may be one or more of a deceleration pedal, an acceleration pedal, or a steering wheel. It may be understood that the execution apparatus 014 may alternatively be an apparatus for controlling horizontal movement of the vehicle and/or vertical movement of the vehicle. A specific implementation form of the execution apparatus 014 is not limited in this embodiment of this application.

It may be understood that different automated driving function applications may reuse some or all of sensing apparatuses, different automated driving function applications may reuse some or all of processing apparatuses, and different automated driving function applications may reuse some or all of execution apparatuses.

For example, when the automated driving function application 1 is an automatic parking function application, the automated driving function application 1 may include but is not limited to: a distance sensor configured to measure a distance to a road shoulder location, a processing apparatus that performs location calculation based on the distance obtained by the sensor, an execution apparatus for moving the vehicle based on a processing result of the processing apparatus.

It should be noted herein that a quantity of automated driving function applications shown in this embodiment and a function executed by each automated driving function application are all examples, and are set based on a requirement of an application scenario. This is not limited herein.

The schematic diagram of the structure of the vehicle shown in FIG. 1 further includes a communications apparatus. The communications apparatus may include at least one apparatus that can enable the automated driving function application to communicate with a cloud server, an external electronic device of the vehicle, and another vehicle. For example, the communications apparatus may include one or more of a wired network interface, a broadcast receiving apparatus, a mobile communications apparatus, a wireless internet apparatus, a local area communications apparatus, and a location (or positioning) information apparatus. The plurality of apparatuses each have a plurality of implementations in the prior art, and details are not described one by one in this application.

The diagram of the structure of the vehicle shown in FIG. 1 may further include internet of vehicles. The internet of vehicles (IoV) is a large system network that implements wireless communication and information exchange between the vehicle and X (Vehicle-to-everything, V2X) based on an intra-vehicle network, an inter-vehicle network, a vehicle-mounted mobile internet, an agreed communication protocol, and a data exchange standard. Usually, X may be classified into an infrastructure, a pedestrian, a vehicle, a network, and the like. The V2X enables communication between vehicles, between the vehicle and a roadside infrastructure, between the vehicle and a person, and between the vehicle and a base station, to exchange information, for example, a series of traffic messages such as a road condition message, a road message, and a pedestrian message.

It should be noted that a specific technology used in communication is not limited in this embodiment of the present application, and includes but is not limited to 2G, 3G, 4G, 5G and C-V2X (a cellular-based V2X technology).

It should be noted that a specific communication manner is not limited in this embodiment of the present application, and includes but is not limited to unicast, multicast, or broadcast.

With reference to the schematic diagram of the structure of the vehicle shown in FIG. 1, the following specifically describes this application by using embodiments.

Figure 2:
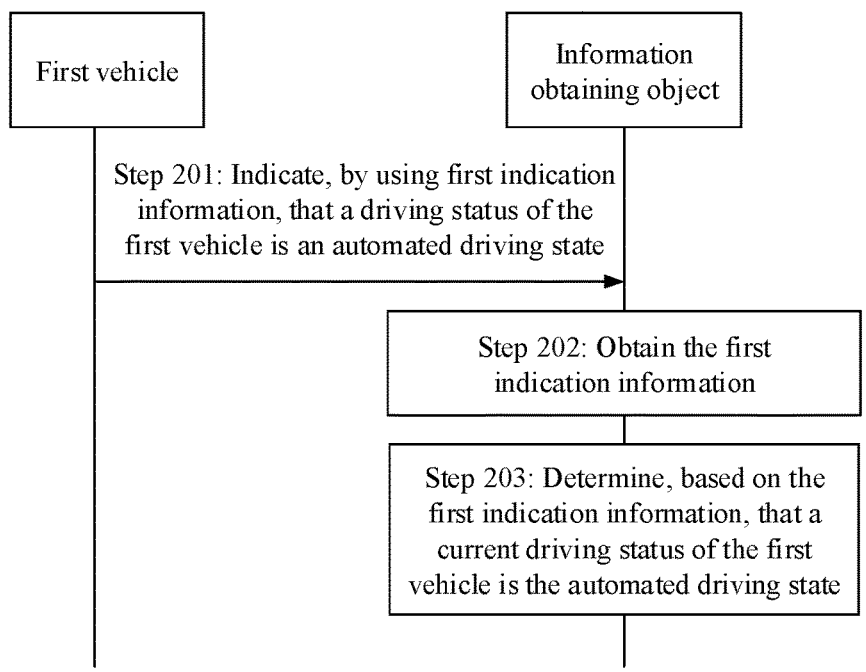
FIG. 2 is a sequence diagram of an embodiment of a system for sending/receiving automated driving information according to this application.

FIG. 2 is a sequence diagram of an embodiment of a system for sending/receiving automated driving information according to this application. The system for sending/receiving automated driving information includes a first vehicle and an information obtaining object.

Step 201: The first vehicle indicates, by using first indication information, that a driving status of the first vehicle is an automated driving state.

The first indication information includes at least one of the following: an identifier disposed on a body of the first vehicle, a preset sound signal sent by the first vehicle, a preset light signal sent by the first vehicle, a preset light color signal sent by the first vehicle, or a preset electromagnetic wave signal sent by the first vehicle.

The identifier disposed on the body of the first vehicle may include but is not limited to a license plate number of the first vehicle and coating of the body of the first vehicle. For example, when the identifier of the body of the first vehicle is the license plate number of the first vehicle, the license plate number of the first vehicle is different from a license plate number of another vehicle. Specifically, when the first vehicle is an automated driving vehicle (for example, a vehicle having an automated driving system whose driving automation level is L3 to L5), the license plate number of the first vehicle may be set to a license plate number different from that of a vehicle having a conventional manual driving function. Therefore, when the first vehicle starts an automated driving function application (for example, driving or automatic parking), it can be determined, by recognizing a special license plate number of the first vehicle, that the driving status of the first vehicle is the automated driving state. The coating of the body of the first vehicle may include but is not limited to coat spraying specified in a traffic regulation or a character identifier. For example, the body of the first vehicle may be identified as the automated driving vehicle by spraying a font of an "automated driving vehicle" style. Therefore, when the first vehicle starts the automated driving function application, it can be determined, by identifying the coating of the body of the first vehicle, that the driving status of the first vehicle is the automated driving state.

In this embodiment, a light signal used to indicate that the driving status of the first vehicle is the automated driving state may be pre-agreed. For example, a light is always on, the light blinks once based on a preset time interval, or the light blinks twice based on a preset time interval. A specific implementation of the light signal used to indicate the automated driving state is set based on a scenario requirement. This is not specifically limited herein.

In this embodiment, a light color used to indicate that the driving status of the first vehicle is the automated driving state may be pre-agreed. For example, the first vehicle may use red as the light color used to indicate that the driving status of the first vehicle is the automated driving state.

In this embodiment, a wavelength of an electromagnetic wave used to indicate that the driving status of the first vehicle is the automated driving state may be pre-agreed on, and the like. The first vehicle indicates, by sending the agreed electromagnetic wave wavelength, that the driving status of the first vehicle is the automated driving state.

It should be noted herein that any two or more pieces of the foregoing indication information may be combined as indication information used to indicate that the driving status of the first vehicle is the automated driving state. For example, a combination of the light signal and the light color may be used as the first indication information. For example, red light information that blinks twice consecutively in the preset time interval may be used as the first indication information.

In this embodiment, when the first vehicle starts the automated driving function application, or the first vehicle receives an instruction used to instruct the first vehicle to start the automated driving function application, the first vehicle may indicate, by using the indication information, that the driving status of the first vehicle is the automated driving state. Herein, the instruction may be sent by a control system (for example, a cloud server) that remotely controls the automated driving vehicle, or may be sent by a passenger or driver in the first vehicle. A specific form of the control system for remotely controlling the automated driving vehicle is not limited in this embodiment of this application. For example, the control system may be a remote dispatcher, a remote driver, or any scheduling entity (for example, an automatically run program). For example, the passenger in the vehicle triggers, by touching a start button or a key in the vehicle, the vehicle to start the automated driving function application. Alternatively, the remote dispatcher starts, by using an instruction, the vehicle to run the automated driving function application.

In this embodiment, that the vehicle starts the automated driving function application also includes a case in which the vehicle is running (which may also be referred to as executing) the automated driving function application. It may be understood that starting the automated driving function application means that the automated driving function application is running. In other words, a function corresponding to the automated driving function application is being executed.

In an application scenario, when the first vehicle starts an automated driving function application of a cruise control system, or receives an instruction used to instruct the first vehicle to start the cruise control system, the first vehicle may be indicated to be in the automated driving state by continuously blinking light twice in the preset time interval.

In another application scenario, when the first vehicle runs (executes) an automated driving function application of automatic parking, a non-blinking red light may be used to indicate that the driving status of the first vehicle is the automated driving state.

In consideration of importance of a speed factor in road safety, in some implementations, "speed" may be further used as a reference condition in specific implementation.

In an embodiment, when the first vehicle starts the automated driving function application, or when the first vehicle receives the instruction used to instruct the first vehicle to start the automated driving function application, and a moving speed of the first vehicle is greater than or equal to a first speed threshold, the indication information may be used to indicate that the driving status of the first vehicle is the automated driving state.

For example, the first vehicle is executing high-speed cruise of the automated driving function application. When a speed of the first vehicle is greater than 30 kilometers (the first speed threshold), the first vehicle indicates, by using the indication information, that the driving status of the first vehicle is the automated driving state.

In another embodiment, when the first vehicle receives the instruction used to instruct the first vehicle to start the automated driving function application, and a highest speed in an operational design domain corresponding to the function application is greater than or equal to a second speed threshold, the first vehicle may indicate, by using the indication information, that the driving status of the first vehicle is the automated driving state.

For example, the first vehicle is executing high-speed cruise of the automated driving function application. It is assumed that an operational design domain of the high-speed cruise is a speed range of 40 to 80 kilometers, and it is assumed that the second speed threshold is 50 kilometers. Because 80 kilometers is greater than 50 kilometers, when the first vehicle executes the high-speed cruise of the automated driving function application, the first vehicle indicates, by using the indication information, that the driving status of the first vehicle is the automated driving state.

A configuration manner of the first speed threshold and the second speed threshold is not limited in this embodiment of this application. For example, the first speed threshold and the second speed threshold may be configured on the first vehicle through V2X communication, or may be pre-configured when the vehicle is delivered from a factory.

Step 202: The information obtaining object obtains the first indication information.

In this embodiment, after the first vehicle indicates, by using the first indication information in the step 201, that the driving status of the first vehicle is the automated driving state, the information obtaining object may obtain the first indication information.

The information obtaining object may include but is not limited to a roadside device disposed around a road (for example, on one side of the road or on two sides of the road), a pedestrian, or a second vehicle around the first vehicle. The roadside device may include but is not limited to a roadside infrastructure, a roadside base station, a roadside display panel, and the like. The display panel may be, for example, configured to display a vehicle speed, the identifier of the first vehicle (for example, the license plate number of the first vehicle), and mark a current driving status (for example, the automated driving state) of the first vehicle.

The information obtaining object may further include a participant in an environment around the first vehicle, including but not limited to a pedestrian, another vehicle, and the like.

Step 203: The information obtaining object determines, based on the first indication information, that the current driving status of the first vehicle is the automated driving state.

For example, the information obtaining object may determine, by using one or more of a light signal, a light color signal, a sound signal, or the identifier of the body of the first vehicle that is sent by the first vehicle and that is used to indicate the automated driving state of the first vehicle, that the current driving status of the first vehicle is the automated driving state.

In some optional implementations, the first indication information further indicates a driving automation level of the automated driving function application.

The driving automation level is a level in a driving automation level set, and the driving automation level set includes one or more of a first level, a second level, and a third level. The first level is conditional driving automation (Conditional Automation), the second level is high driving automation (High Automation), and the third level is full driving automation (Full Automation).

For example, in the first level, the automated driving vehicle may implement the automated driving state under a specific operational design domain. However, when a system failure occurs in the automated driving system or the automated driving system runs beyond the operational design domain of the automated driving system, a fallback-ready user needs to take over. In other words, the automated driving state needs to be switched to the manual driving state, to continue to perform the dynamic driving task (DDT) or reach a minimal risk condition. The system failure means that the automated driving system and/or another system of the vehicle are/is malfunctioned (malfunction), and consequently the automated driving system cannot continuously and reliably complete all or some dynamic driving tasks.

In the second level, the automated driving vehicle can automatically complete all dynamic driving tasks under the operational design domain (ODD). When the system failure occurs in the automated driving system or the operational design domain of the automated driving system is exceeded, the system automatically reaches the minimal risk condition (also referred to as automated driving system takeover), and the fallback-ready user may not need to intervene (in other words, the system does not need to switch from the automated driving state to the manual driving state).

The minimal risk condition is a stable stop condition that is reached as much as possible after the automated driving system or the fallback-ready user takes over, to reduce a risk of collision when a trip cannot continue. The minimal risk condition may be reached by a person operating a vehicle, or may be reached by the automated driving system operating a vehicle. For example, the minimal risk condition that can be achieved by the vehicle depends on a system failure status and/or the operational design domain, and a design of the automated driving function application. For example, when a sensor of the automated driving system fails, the fallback-ready user takes over the system, so that the vehicle can park by a road shoulder. In this case, that the vehicle can park by the road shoulder is the minimal risk condition. For another example, if the automated driving system loses a steering capability and cannot perform an effective steering operation, the automated driving system operates the vehicle to perform a deceleration operation in a current driving direction until the vehicle completely stops. In this case, deceleration and parking in the driving direction is the minimal risk condition. For another example, if the vehicle still has a specific steering capability and a sensing capability, a lane line may be identified, and the automated driving system may operate the vehicle to park in the lane line. In this case, parking in the lane line is the minimal risk condition. The braking operation that is performed to reach the minimal risk condition is referred to as minimal risk maneuver.

In the third level, the automated driving vehicle can implement all-region and all-weather automated driving without any manual intervention. The automated driving vehicle of this level can also cope with environmental changes such as geographical and climate changes. In other words, the vehicle of this level can complete the dynamic driving task in any road condition (any weather and any road condition that a human driver can complete driving) in any weather condition.

The operational design domain is also referred to as an operational design domain, and is an operational design domain (Operating conditions under which a given driving automation system or feature thereof is specifically designed to function) in which an automated driving system or a function application of the automated driving system is designed to run. Generally, an operational design domain of an automated driving function. For example, the operational design domain may include but is not limited to an environment, a geographical location, a time limit, a traffic and road feature, a running speed, and the like. It may be understood that the ODD also includes a feature of the system, for example, one or more of a sensing capability, a decision-making capability, and an execution capability that are used for function running.

The driving automation level is indicated, so that the information obtaining object can learn more about driving automation information of the vehicle that is currently in the automated driving state, to improve road safety. For example, it may be obtained that the minimal risk condition can be automatically reached, whether there is a limitation on the operational design domain, and the like, so that in some complex road conditions (for example, traffic congestion, a narrow road, and an uneven road), more accurate determining can be made, to improve driving safety.

In this embodiment, the first vehicle may indicate the driving automation level by using information such as the light signal, the light color signal, and the identifier of the body of the vehicle.

As an example, the first level may be obtained by using two consecutive blinks of light in the preset time interval, the second level may be obtained by using three consecutive blinks of light in the preset time interval, and the third level may be obtained by using four consecutive blinks of light in the preset time interval. Alternatively, the automated driving level of the first vehicle may be indicated by spraying coating such as "L1", "L2", or "L3" on the body of the first vehicle.

In an embodiment, light signals of different colors may be used to indicate different driving automation levels. It may be understood that, for example, because light transmission is high, different driving automation levels are indicated by using the light signals of different colors, so that in bad weather such as a foggy day, when the driving automation level information or light blinking information that is set on the body of the vehicle cannot be distinguished due to low visibility, the information obtaining object can more easily obtain the driving automation level information of the first vehicle, to improve road safety. For example, a yellow light signal may be used to indicate the first level, a red light signal may be used to indicate the second level, and a blue light signal may be used to indicate the third level. Herein, the light color signal used to indicate each automation level is not specifically limited, and may be selected based on a requirement of an application scenario.

In some optional implementations of this embodiment, fallback-ready user status information corresponding to the first vehicle may be further indicated. A fallback-ready user corresponding to the first vehicle refers to a person responsible for taking over (switching from the automated driving state to the manual driving state) the first vehicle. The person responsible for taking over may be a fallback-ready user inside the first vehicle, or may be a fallback-ready user outside the first vehicle, for example, a remote fallback-ready user. The remote fallback-ready user can take over the vehicle through a remote instruction, perform the dynamic driving task, or enable the vehicle to reach the minimal risk condition. When the fallback-ready user takes over the vehicle, the fallback-ready user becomes a driver of the vehicle.

For example, the fallback-ready user status may include, for example, but is not limited to: a tired state, a sleep state, a mentally concentrated state, and other working states (for example, reading a book or playing a mobile phone). For example, an image obtaining apparatus may be installed in the first vehicle or a remote monitoring room, so that a face image of the fallback-ready user may be obtained in real time or based on the preset time interval. Then, the image recognition apparatus (for example, the image recognition apparatus may be disposed in the automated driving system) in the first vehicle analyzes a collected face image of the fallback-ready user (for example, may perform recognition on the face image through a pre-trained neural network used for status recognition), to obtain status information of the fallback-ready user.

In some optional implementations of this embodiment, status information of the fallback-ready user corresponding to the first vehicle may alternatively be one or more of a takeover capability and response time of the fallback-ready user. For example, based on information such as a status and an age of the fallback-ready user, one or more of the takeover capability of the fallback-ready user to take over the first vehicle and the response time may be determined, and the takeover capability and/or the response time are/is indicated, to improve road safety. For example, a surrounding traffic participant may know whether the fallback-ready user has sufficient capability when an emergency occurs, and/or whether the fallback-ready user can timely take over the automated driving system (switch from the automated driving state to the manual driving state). For example, when the fallback-ready user is in a good state and takeover time is relatively short, the indication information of the first vehicle is set to the yellow light; or when the fallback-ready user is dozing and the takeover time is relatively short, the indication information of the first vehicle is set to the red light.

A method and a body for determining the takeover capability and/or the response time of the fallback-ready user are/is not limited in this embodiment of this application, for example, may be determined by a driver monitoring system in the automated driving system, or may be determined by another system other than the automated driving system. Alternatively, the takeover capability and/or response time is determined based on a regional or industry standard.

In some optional implementations of this embodiment, the status information of the fallback-ready user corresponding to the first vehicle may further indicate whether there is a fallback-ready user taking over the automated driving system (switch from the automated driving state to the manual driving state). Whether there is the fallback-ready user corresponding to the first vehicle is indicated, to improve road safety. For example, the surrounding traffic participant may learn whether a fallback-ready user can timely take over the automated driving system (switch from the automated driving state to the manual driving state) when an emergency occurs. For example, when there is the fallback-ready user corresponding to the first vehicle, the indication information of the first vehicle is set to the yellow light; or when there is no fallback-ready user corresponding to the first vehicle, the indication information of the first vehicle is set to the red light.

It may be understood that the status information of the fallback-ready user is mainly for an automated driving vehicle with manual participation, in other words, the first vehicle having the first level in the driving automation level set. However, the status information of the fallback-ready user may also be applied to a vehicle of another level. This is not limited in this embodiment of this application. For example, although a highly automatic system may reach the minimal risk condition without the fallback-ready user, existence of the indication information of the fallback-ready user is still useful for other traffic participants, and helps improve road safety.

Figure 3:
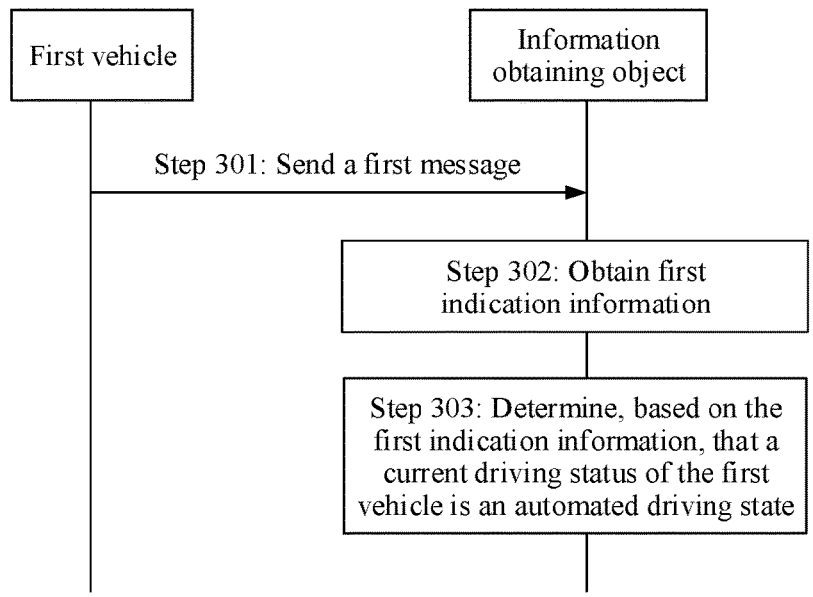
FIG. 3 is a sequence diagram of another embodiment of a system for sending/receiving automated driving information according to this application.

FIG. 3 is a sequence diagram of another embodiment of a system for sending/receiving automated driving information according to this application. The system for sending/receiving automated driving information includes a first vehicle and an information obtaining object. Specific implementation of this embodiment includes the following steps.

Step 301: The first vehicle sends a first message to the information obtaining object.

In this embodiment, the first vehicle may send the first message to the information obtaining object through internet of vehicles (V2X) or a communications device. The first message includes first indication information. Content indicated by the first indication information is the same as content indicated by the first indication information specifically described above. Details are not described herein again.

In this embodiment, when the first vehicle starts an automated driving function application, or the first vehicle receives an instruction used to instruct the first vehicle to start an automated driving function application, the first vehicle may indicate, by using the indication information, that a driving status of the first vehicle is an automated driving state.

In this embodiment, the first message further includes second indication information. The second indication information indicates a fallback-ready user status corresponding to the first vehicle. For example, the second indication information may include image data and text data, or may include only image data, or may include only text data. In other words, a fallback-ready user status recognition apparatus in the first vehicle may send recognized text data of the fallback-ready user status and recognized facial image data of the fallback-ready user to the information receiving object. Alternatively, the fallback-ready user status recognition apparatus sends only the facial image data of the fallback-ready user to the information receiving end, so that the information receiving object having an image recognition capability identifies the fallback-ready user status. Alternatively, the fallback-ready user status recognition apparatus sends only the recognized text data of the fallback-ready user status to the information receiving object.

In some optional implementations of this embodiment, status information of the fallback-ready user corresponding to the first vehicle may alternatively be one or more of a takeover capability and response time of the fallback-ready user. For specific descriptions of the optional implementation and beneficial effects brought by the optional implementation, refer to related descriptions in the embodiment shown in FIG. 2 and step 203. Details are not described herein again.

In some optional implementations of this embodiment, the status information of the fallback-ready user corresponding to the first vehicle may further indicate whether there is a fallback-ready user taking over an automated driving system (switch from an automated driving state to a manual driving state). For specific descriptions of the optional implementation and beneficial effects brought by the optional implementation, refer to related descriptions in the embodiment shown in FIG. 2 and step 203. Details are not described herein again. In this embodiment, the first message may further include third indication information used to indicate a capability of the first vehicle. The capability includes at least one of the following: a current sensing capability, a current horizontal control capability, a current vertical control capability, a minimal risk condition that can be currently reached, a maximum sensing capability of a system, a maximum horizontal control capability of the system, a maximum vertical control capability of the system, or a minimal risk condition that can be currently reached by the system.

In an embodiment, the current sensing capability may include, for example, one or more of positions, directions, types, a quantity of currently working sensors, and a usage of each sensor in the working sensors. The current vertical control capability may include an acceleration and/or deceleration braking capability. The current horizontal control capability may include steering braking capability. The maximum sensing capability of the system may include positions, directions, a quantity, and types of all sensors included in the system, a usage of each sensor, and the like. The minimal risk condition that can be reached by the system is a minimal risk condition that can be ideally reached by the system and that is determined during design. The minimal risk condition includes but is not limited to at least one of road shoulder parking, in-lane parking, and hard deceleration parking (which does not necessarily ensure in-lane parking). The minimal risk condition that can be currently reached is a minimal risk condition that can be reached based on a current system capability. For example, in a case in which a current direction sensing capability is not completely lost, and a steering and braking capability is not completely lost, assuming that there is an available road shoulder, in this case, assuming that the system can implement the road shoulder parking, a maximum risk condition that can be reached by the system is the road shoulder parking. However, due to failure of a forward sensor and a loss of steering capability, the current system can only implement hard deceleration parking. In this way, a risk condition that can be currently reached is the hard deceleration parking.

In an embodiment, content indicated by the third indication information may be combined for sending. For example, the third indication information may include the current sensing capability and the maximum sensing capability of the system. In this way, after obtaining the third indication information, the information obtaining object may determine a sensor running status of the first vehicle by comparing the current sensing capability with the maximum sensing capability of the system, to make an emergency response policy when the first vehicle is faulty or another problem occurs, and improve driving safety of a vehicle in the automated driving state on a road.

In another embodiment, the first message may further include one or more of whether a sensing capability exists currently, whether a horizontal control capability exists currently, and whether a vertical control capability exists currently. For example, when the horizontal control capability is lost, the first message includes indication information used to indicate that the horizontal control capability does not exist (lost), so that a surrounding traffic participant learns that the automated driving system of the first vehicle loses the horizontal control capability (the steering capability) of the vehicle. In this way, the surrounding traffic participant may perform emergency rescue or assistance on the first vehicle, facilitate or help the first vehicle to pass through, or avoid the automated driving vehicle, to improve road safety.

Alternatively, in another embodiment, the first message may further include indication information used to indicate a ratio of a current remaining capability of the system to a maximum capability of the system. For example, the first message includes a ratio of the current sensing capability to the maximum sensing capability of the system, to indicate a percentage of the remaining capability of the system.

It should be noted that, usually, in this embodiment, the current sensing capability, the current horizontal control capability, the current vertical control capability, the minimal risk condition that can be currently reached, the maximum sensing capability of the system, the maximum horizontal control capability of the system, the maximum vertical control capability of the system, or a minimal risk condition that can be reached by the system is corresponding to an automated driving function application.

Optionally, the current sensing capability, the current horizontal control capability, the current vertical control capability, the minimal risk condition that can be currently reached, the maximum sensing capability of the system, the maximum horizontal control capability of the system, the maximum vertical control capability of the system, or one or more of minimal risk conditions that can be achieved by the system may correspond to an entire automated driving system or an entire vehicle. The automated driving system may include one or more automated driving function applications. For example, the automated driving system may include high-speed cruise of an automated driving function application 1 and automatic parking of an automated driving function application 2. In this case, the automated driving system is executing the high-speed cruise of the automated driving function application 1. In this case, the current sensing capability, the current horizontal control capability, the current vertical control capability, the minimal risk condition that can be currently reached, the maximum sensing capability of the system, the maximum horizontal control capability of the system, the maximum vertical control capability of the system, one or more of the minimal risk conditions that can be maximally reached by the system may correspond to the high-speed cruise function of the automated driving function application 1. For example, in a high-speed cruise scenario, the minimal risk condition that the system can maximally achieve is road shoulder parking.

Certainly, in another embodiment, the current sensing capability, the current horizontal control capability, the current vertical control capability, the minimal risk condition that can be currently reached, the maximum sensing capability of the system, the maximum horizontal control capability of the system, the maximum vertical control capability of the system, or one or more of the minimal risk conditions that can be maximally reached by the system may correspond to the entire automated driving system. In this case, assuming that the system executes the automatic parking of the automated driving function application 2, the maximum sensing capability of the system may be a sensor capability of the entire automated driving system.

In this embodiment, the first message may further include fourth indication information used to indicate the automated driving function application and/or fifth indication information used to indicate an operational design domain corresponding to the automated driving function application.

For example, the fourth indication information used to indicate the automated driving function application may include but is not limited to the fourth indication information used to indicate the automated driving function application being executed (also referred to as running). For example, the automated driving function may include a high-speed cruise function, an automated valet parking function, an automatic cruise function in traffic congestion, and a low-speed automated driving function in a limited working condition.

For example, the operational design domain may include but is not limited to an environment, a geographical location, a time limit, a traffic and road feature, a running speed, and the like. It may be understood that the ODD also includes a feature of the system, for example, one or more of a sensing capability, a decision-making capability, and an execution capability that are used for function running. For example, factors such as the geographical location and the traffic road in the ODD may be roughly classified into three scenarios: a highway scenario, an urban area scenario, and a suburban area scenario. The time limit can be classified into the following types: morning, noon, evening, and night. The environment can be roughly classified into sunny days, rainy days, and snowy days.

It may be understood that, in another embodiment, the information obtaining object may determine, based on the operational design domain included in the fifth indication information, whether the first vehicle is outside the operational design domain, to determine a status (for example, an abnormal or faulty state) of the first vehicle, and further perform emergency rescue or assistance on the first vehicle, facilitate or help the first vehicle to pass through, or avoid the automated driving vehicle, to improve road safety. For example, the fifth indication information includes running speed indication information, indicating that a running range is less than 60 kilometers. When the information obtaining object (for example, a roadside device) detects, through a sensor (for example, a radar) of the information obtaining object, that a running speed of the first vehicle is greater than 60 kilometers, it is determined that the first vehicle is in the abnormal state.

Step 302: The information obtaining object obtains the first indication information from the first vehicle.

In this embodiment, after the first vehicle sends the message carrying the first indication information in the step 301, the information obtaining object may parse the first message, to obtain the first indication information from the first vehicle.

The information obtaining object for obtaining the first indication information may be a roadside device disposed around a road (for example, on one side of the road or on two sides of the road), a pedestrian, a second vehicle around the first vehicle, a cloud server that can communicate with the first vehicle, or the like.

Step 303: The information obtaining object determines, based on the first indication information, that a current driving status of the first vehicle is the automated driving state.

In this embodiment, after receiving the first indication information sent by the first vehicle, the information obtaining object may perform parsing on the first indication information in various manners. Therefore, it may be determined that the current driving status of the first vehicle is the automated driving state. For example, after receiving the first message, the information obtaining object may parse out the first indication information based on a preset communications protocol. Then, according to a pre-agreed data reading rule, the driving status indicated by the first indication information is read as the automated driving state, to determine that the current driving status of the first vehicle is the automated driving state.

In some optional implementations of this embodiment, the first vehicle may further send a second message to an information receiving object through the interne of vehicles (V2X) or the communications device.

The second message may include the third indication information used to indicate the capability of the first vehicle.

The second message further includes the fourth indication information used to indicate the automated driving function application and/or the fifth indication information used to indicate the operational design domain corresponding to the automated driving function application.

It should be noted herein that the first indication information, the second indication information, the third indication information, the fourth indication information, and the fifth indication information may all be set in a same message, in other words, sent by using the first message, or may be set in different messages. To be specific, the first indication information, the second indication information, and the third indication information are sent by using the first message, and the fourth indication information and the fifth indication information are sent by using the second message. In other words, when the first message includes the third indication information and the fourth indication information, when sending the second message, the first vehicle may send only the second message including the fifth indication information, and the second message does not need to carry the third indication information and the fourth indication information.

It should be noted herein that the second message indicates all messages that are sent by the first vehicle to the information obtaining object and that are different from the first message. In other words, the second message may be a message sent once, or may be a message sent a plurality of times. For example, after sending the first indication information and the second indication information to the information obtaining object, the first message may send the third indication information to the information obtaining object by using one second message, and then send the fourth indication information and/or the fifth indication information to the information obtaining object by using one second message.

It should be noted herein that a quantity of selected first messages, a quantity of selected second messages, and content of indication information included in each first message and each second message are not specifically limited, and are set based on a requirement of an application scenario.

A quantity of messages and content of indication information included in each message are set based on a scenario requirement, so that resources can be properly used, and a message transmission effect can be improved.

In some optional implementations of this embodiment, the step of determining that the current driving status of the first vehicle is the automated driving state may further include: determining a driving automation level corresponding to the first vehicle.

The driving automation level is a level in a driving automation level set, and the driving automation level set includes at least one or more of a first level, a second level, and a third level, and the first level is conditional driving automation (Conditional Automation); the second level is high driving automation (High Automation); and the third level is full driving automation (Full Automation).

Herein, after obtaining the first indication information, the information obtaining object may first determine the current driving status of the first vehicle indicated by the first indication information, and then determine the driving automation level corresponding to the first vehicle. Alternatively, after obtaining the first indication information, the information obtaining object may determine the current driving status of the first vehicle and the corresponding driving automation level. Alternatively, the information obtaining object may directly determine the driving automation level. For example, when it is determined that the driving automation level corresponding to the first vehicle is the second level, it may be determined that the driving status corresponding to the first vehicle is the automated driving state.

In some optional implementations of this embodiment, the information obtaining object may further obtain at least one piece of the second indication information, the third indication information, the fourth indication information, and the fifth indication information.

The second indication information is used to indicate the fallback-ready user status corresponding to the first vehicle. The third indication information is used to indicate a capability of the first vehicle. The fourth indication information is used to indicate the automated driving function application being executed or to be executed by the first vehicle. The fifth indication information is used to indicate an operational design domain corresponding to the automated driving function application being executed or to be executed by the first vehicle.

Herein, content indicated by the second indication information, the third indication information, the fourth indication information, and the fifth indication information that are obtained by the information obtaining object is the same as content indicated by the second indication information, the third indication information, the fourth indication information, and the fifth indication information that are sent by the first vehicle. Details are not described herein again.

It can be learned from FIG. 3 that, different from the embodiment shown in FIG. 2, this embodiment highlights the step in which the first vehicle sends, to the information obtaining object by using an internet of vehicles technology or a communications technology, a message that carries each piece of indication information. Therefore, in this embodiment, various types of indication information sent to each electronic device can be more accurate.

Figure 4:
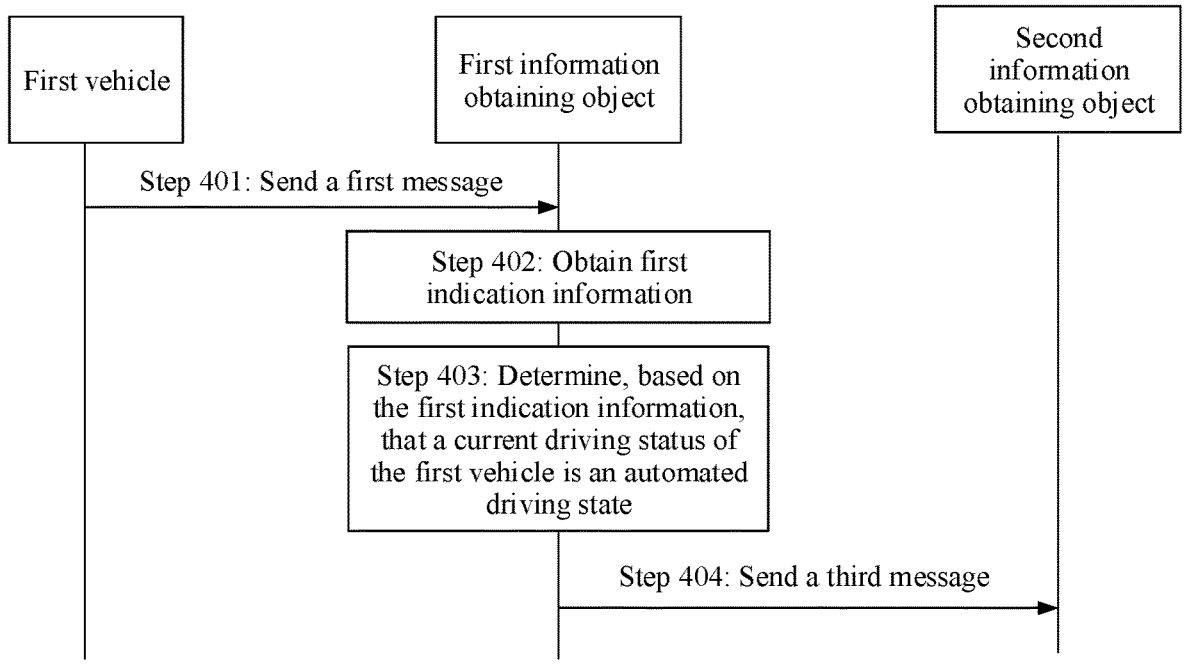
FIG. 4 is a sequence diagram of still another embodiment of a system for sending/receiving automated driving information according to this application.

FIG. 4 is a sequence diagram of still another embodiment of a system for sending/receiving automated driving information according to this application. The system for sending/receiving automated driving information includes a first vehicle, a first information obtaining object, and a second information obtaining object.

In this embodiment, the first information obtaining object may be an electronic device (for example, a roadside device) disposed around a road, or may be a cloud server. The second information obtaining object may be a traffic participant around the first vehicle, and includes but is not limited to a pedestrian, a second vehicle, and the like. Herein, the first information obtaining object may send obtained automated driving information of the first vehicle to the second information obtaining object. Specifically, the following steps are included.

Step 401: The first vehicle sends a first message to the first information obtaining object.

Step 402: The first information obtaining object obtains the first indication information from the first vehicle.

Step 403: The first information obtaining object determines, based on the first indication information, that a current driving status of the first vehicle is an automated driving state.

In this embodiment, for specific implementations of the step 401 to the step 403 and beneficial effects brought by the step 401 to the step 403, refer to the step 301 to the step 303 in the embodiment shown in FIG. 3. Details are not described herein again.

Step 404: The first information obtaining object sends a third message to the second information obtaining object.

In this embodiment, the first information obtaining object may include an external device (for example, a loudspeaker or a display panel). When the first information obtaining object is the cloud server, the roadside device, another vehicle around the first vehicle, or the electronic device around the road, and the second information obtaining object is the second vehicle, the first information obtaining object sends the third message to the second information obtaining object. When the first information obtaining object is the electronic device disposed around the road and is connected to the external device such as the loudspeaker or the display panel, and the second information obtaining object is the pedestrian and/or the second vehicle, the first information obtaining object may send the third message by using the loudspeaker or the display panel. Herein, the third message includes sixth indication information, and the sixth indication information indicates that the driving status of the first vehicle is the automated driving state.

It should be noted that a specific technology used in communication is not limited in this embodiment of the present application, and includes but is not limited to 2G, 3G, 4G, 5G and C-V2X (a cellular-based V2X technology).

It should be noted that a specific communication manner is not limited in this embodiment of the present application, and includes but is not limited to unicast, multicast, or broadcast.

In some optional implementations of this embodiment, the sixth indication information further indicates a driving automation level of an automated driving function application being executed or to be executed by the first vehicle. The driving automation level is a level in a driving automation level set, and the driving automation level set includes at least one or more of a first level, a second level, and a third level, and the first level is conditional driving automation (Conditional Automation); the second level is high driving automation (High Automation); and the third level is full driving automation (Full Automation).

Herein, content indicated by the sixth indication information corresponds to the content indicated by the first indication information in the embodiment shown in FIG. 2. For detailed descriptions of the sixth indication information, refer to the related descriptions of the first indication information in the embodiment shown in FIG. 2. Details are not described herein again.

The third message further includes tenth indication information, and the tenth indication information indicates a fallback-ready user status corresponding to the first vehicle.

The third message further includes seventh indication information used to indicate a capability of the first vehicle. The capability includes at least one of the following: a current sensing capability, a current horizontal control capability, a current vertical control capability, a minimal risk condition that can be currently reached, a maximum sensing capability of a system, a maximum horizontal control capability of the system, a maximum vertical control capability of the system, or a minimal risk condition that can be currently reached by the system.

Content indicated by the seventh indication information and content indicated by the tenth indication information correspond to the content indicated by the second indication information and the content indicated by the third indication information in the embodiment shown in FIG. 3. For detailed descriptions of the tenth indication information and the eleventh indication information, refer to related descriptions of the second indication information and the third indication information in the embodiment shown in FIG. 3. Details are not described herein again.

In some implementations of this embodiment, the third message further includes eleventh indication information used for confidence of at least one piece of indication information in the third message or comprehensive confidence of all pieces of indication information included in the third message.

For example, after obtaining the automated driving information, the first information obtaining object may determine confidence of the automated driving information. The confidence is used to evaluate reliability of each piece of to-be-sent indication information.

A confidence value may be set for each piece of indication information included in the third message, or a confidence value may be set for at least one piece of indication information included in the third message. For example, the first obtaining object views a blinking light signal of the first vehicle within a distance greater than a preset threshold, and the blinking light signal is similar to a preset light signal used to indicate the automated driving state. Because the distance is relatively long, reliability of information obtained by the first obtaining object is relatively low. In this case, the confidence value of the sixth indication information may be set based on the distance. Likewise, comprehensive analysis may be performed based on a distance of a light signal and an identifier of the first vehicle, to determine a confidence value of the sixth indication information. Alternatively, comprehensive evaluation may be performed on all pieces of indication information included in the third message, to obtain a comprehensive confidence value. For example, when the third message includes the sixth indication information and the tenth indication information, because the sixth indication information is used to indicate that the first vehicle is in the automated driving state, a relatively high weight may be set for the indication information, and a relatively low weight may be set for the tenth indication information used to indicate the fallback-ready user status. Then, after comprehensive analysis and determining are performed on the indication information, a final comprehensive confidence score is obtained, to determine a reliability degree of the first vehicle as an automated driving vehicle.

In some optional implementations of this embodiment, the first information obtaining object may further send a fourth message to the second information obtaining object.

The fourth message includes seventh indication information used to indicate a capability of the first vehicle.

The fourth message further includes eighth indication information used to indicate the automated driving function application and/or ninth indication information used to indicate an operational design domain corresponding to the automated driving function application.

Content indicated by the seventh indication information, the eighth indication information, and the ninth indication information corresponds to the content indicated by the third indication information, the fourth indication information, and the fifth indication information in the embodiment shown in FIG. 3. For detailed descriptions of the seventh indication information, the eighth indication information, and the ninth indication information, refer to related descriptions of the third indication information, the fourth indication information, and the fifth indication information in the embodiment shown in FIG. 3. Details are not described herein again.

The fourth message further includes twelfth indication information used for confidence of at least one piece of indication information in the fourth message or comprehensive confidence of all pieces of indication information included in the fourth message.

For a specific method for determining content indicated by the twelfth indication information, refer to the foregoing method for determining the confidence indicated by the eleventh indication information. Details are not described herein again.

It should be noted herein that the sixth indication information, the seventh indication information, the eighth indication information, the ninth indication information, and the tenth indication information may be set in a same message, in other words, sent by using the third message, or may be set in different messages. To be specific, the sixth indication information, the seventh indication information, the tenth indication information, and the eleventh indication information are sent by using the third message, and the eighth indication information, the ninth indication information, and the twelfth indication information are sent by using the fourth message.

It should be noted herein that the fourth message refers to all messages that are sent by the first obtaining object to the second information obtaining object and that are different from the third message. In other words, the fourth message may be a message sent once, or may be a message sent at different times.

It can be learned from FIG. 4 that, different from the system for sending/receiving automated driving information shown in FIG. 2, the system for sending/receiving automated driving information shown in this embodiment of this application includes the first information obtaining object and the second information obtaining object, and the first information obtaining object may play a role of information obtaining and forwarding. In this way, more vehicles and/or pedestrians can identify the first vehicle whose current driving status is the automated driving state, to improve driving safety of the automated driving vehicle in the automated driving state on a road.

The foregoing mainly describes the solutions of the embodiments of this application from a perspective of interaction between terminals. It may be understood that, to implement the foregoing functions, an apparatus for indicating automated driving information, an apparatus for obtaining automated driving information, and an apparatus for sending automated driving information include corresponding hardware structures and/or software modules for performing the functions. A person of ordinary skill in the art should easily be aware that, in combination with the examples described in the embodiments disclosed in this specification, units, algorithms, and steps may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In the embodiments of this application, the apparatus for indicating automated driving information, the apparatus for obtaining automated driving information, and the apparatus for sending automated driving information may be divided into functional modules based on the foregoing method examples. For example, each functional module may be obtained through division based on each corresponding function, or two or more functions may be integrated into one processing module. The integrated module may be implemented in a form of hardware, or may be implemented in a form of a software functional module. It should be noted that, in this embodiment of this application, module division is an example, and is merely a logical function division. In actual implementation, another division manner may be used.

Figure 5:
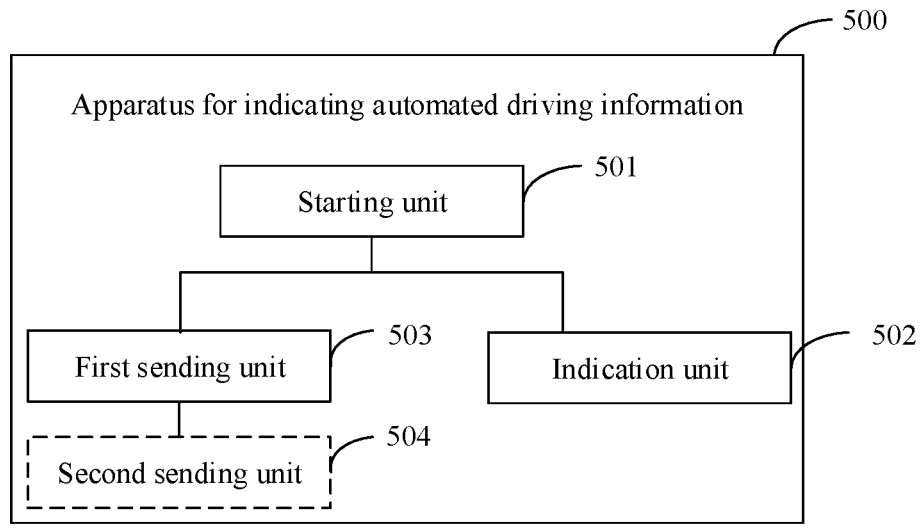
FIG. 5 is a schematic diagram of a structure of an embodiment of an apparatus for indicating automated driving information according to this application.
Figure 6:
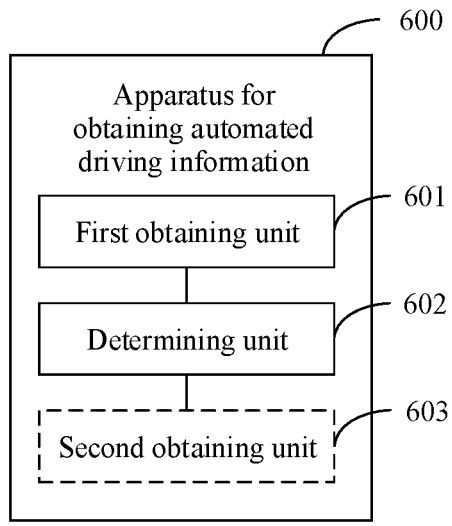
FIG. 6 is a schematic diagram of a structure of an embodiment of an apparatus for obtaining automated driving information according to this application.
Figure 7:
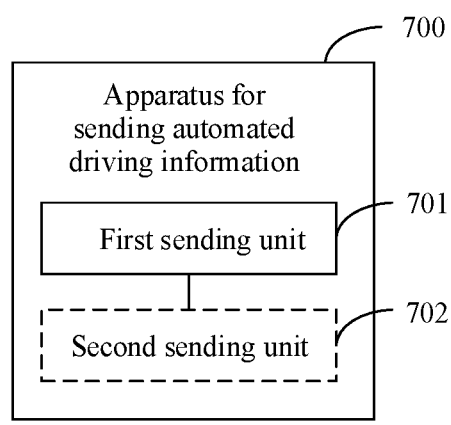
FIG. 7 is a schematic diagram of a structure of an embodiment of an apparatus for sending automated driving information according to this application.

When each functional module is obtained through division based on each corresponding function, FIG. 5 to FIG. 7 are respectively schematic diagrams of structures of an apparatus for indicating automated driving information, an apparatus for obtaining automated driving information, and an apparatus for sending automated driving information according to an embodiment of this application. For details, refer to the following descriptions.

FIG. 5 is a schematic diagram of a structure of an apparatus for indicating automated driving information according to an embodiment of this application. The apparatus for indicating automated driving information may be applied to the vehicle in FIG. 1. As shown in FIG. 5, the apparatus 500 for indicating automated driving information may include:

a starting unit 501, configured to start an automated driving function application, or receive an instruction used to instruct the first vehicle to start an automated driving function application;

an indication unit 502 configured to indicate, by using first indication information, that a driving status of the first vehicle is an automated driving state;

a first sending unit 503, configured to send a first message, where the first message includes first indication information, and the first indication information indicates a driving status of the first vehicle.

In the foregoing manner, the first vehicle may indicate that the driving status of the first vehicle is the automated driving state, or send the first message to indicate that the driving status of the first vehicle is the automated driving state. Therefore, a surrounding traffic participant identifies, based on the indication information of the first vehicle or the sent message, that the driving status of the first vehicle is the automated driving state, to improve traffic safety of an entire road.

Optionally, the first indication information further indicates a driving automation level of the automated driving function application.

Optionally, the driving automation level is a level in a driving automation level set, and the driving automation level set includes at least one or more of a first level, a second level, and a third level, and the first level is conditional driving automation (Conditional Automation); the second level is high driving automation (High Automation); and the third level is full driving automation (Full Automation).

Optionally, the first vehicle indicates, by using second indication information, a fallback-ready user status corresponding to the first vehicle.

Optionally, the apparatus for indicating automated driving information further includes a second sending unit 504, configured to send a second message, where the second message includes third indication information used to indicate a capability of the first vehicle.

Optionally, the apparatus for indicating automated driving information further includes the second sending unit 504, configured to send the second message, where the second message further includes fourth indication information used to indicate the automated driving function application and/or fifth indication information used to indicate an operational design domain corresponding to the automated driving function application.

Optionally, the first message further includes second indication information, and the second indication information indicates a fallback-ready user status corresponding to the first vehicle.

Optionally, the first message further includes third indication information used to indicate a capability of the first vehicle.

Optionally, the capability includes at least one of the following: a current sensing capability, a current horizontal control capability, a current vertical control capability, a minimal risk condition that can be currently reached, a maximum sensing capability of a system, a maximum horizontal control capability of the system, a maximum vertical control capability of the system, or a minimal risk condition that can be currently reached by the system.

Optionally, the first message further includes fourth indication information used to indicate the automated driving function application and/or fifth indication information used to indicate an operational design domain corresponding to the automated driving function application.

Optionally, the first indication information includes at least one of the following: an identifier disposed on a body of the first vehicle, a preset sound signal sent by the first vehicle, a preset light signal sent by the first vehicle, a preset light color signal sent by the first vehicle, or a preset electromagnetic wave signal sent by the first vehicle.

Optionally, light signals of different colors are used to indicate different driving automation levels.

FIG. 6 is a schematic diagram of a structure of an apparatus for obtaining automated driving information according to an embodiment of this application. The apparatus for obtaining automated driving information may be applied to an electronic device communicatively connected to the vehicle shown in FIG. 1. As shown in FIG. 6, the apparatus 600 for obtaining automated driving information may include:

a first obtaining unit 601, configured to obtain first indication information, where the first indication information is used to indicate a driving status of a first vehicle; and a determining unit 602, configured to determine, based on the first indication information, that a current driving status of the first vehicle is an automated driving state.

In the foregoing manner, an information obtaining object (for example, a surrounding traffic participant, and an electronic apparatus) identifies, based on the indication information of the first vehicle or a sent message, that the driving status of the first vehicle is the automated driving state, to improve traffic safety of an entire road.

Optionally, the driving automation level is a level in a driving automation level set, and the driving automation level set includes at least one or more of a first level, a second level, and a third level, and the first level is conditional driving automation (Conditional Automation); the second level is high driving automation (High Automation); and the third level is full driving automation (Full Automation).

Optionally, the apparatus for obtaining automated driving information further includes: a second obtaining unit 603, configured to obtain at least one piece of the following indication information: second indication information, where the second indication information is used to indicate a fallback-ready user status corresponding to the first vehicle; third indication information, where the third indication information is used to indicate a capability of the first vehicle; fourth indication information, where the fourth indication information is used to indicate the automated driving function application being executed or to be executed by the first vehicle; and fifth indication information, where the fifth indication information is used to indicate an operational design domain corresponding to the automated driving function application being executed or to be executed by the first vehicle.

Optionally, the capability includes at least one of the following: a current sensing capability, a current horizontal control capability, a current vertical control capability, a minimal risk condition that can be currently reached, a maximum sensing capability of a system, a maximum horizontal control capability of the system, a maximum vertical control capability of the system, or a minimal risk condition that can be currently reached by the system.

FIG. 7 is a schematic diagram of a structure of an apparatus for sending automated driving information according to an embodiment of this application. The apparatus for sending automated driving information may be applied to an electronic device communicatively connected to the vehicle shown in FIG. 1. As shown in FIG. 7, the apparatus 700 for sending automated driving information may include:

a first sending unit 701, configured to send a third message, where the third message includes sixth indication information, and the sixth indication information indicates that a driving status of a first vehicle is an automated driving state.

In the foregoing manner, an information obtaining object (for example, a surrounding traffic participant, and an electronic apparatus) identifies, based on the indication information of the first vehicle or a sent message, that the driving status of the first vehicle is the automated driving state, to improve traffic safety of an entire road.

In an embodiment, the sixth indication information further indicates a driving automation level of an automated driving function application being executed or to be executed by the first vehicle.

In an embodiment, the driving automation level is a level in a driving automation level set, and the driving automation level set includes at least one or more of a first level, a second level, and a third level, and the first level is conditional driving automation (Conditional Automation); the second level is high driving automation (High Automation); and the third level is full driving automation (Full Automation).

Optionally, the apparatus for sending automated driving information further includes a second sending unit 702, configured to send a fourth message, where the fourth message includes seventh indication information used to indicate a capability of the first vehicle.

Optionally, the apparatus for sending automated driving information further includes the second sending unit 702, configured to send the fourth message, where the fourth message further includes eighth indication information used to indicate the automated driving function application and/or ninth indication information used to indicate an operational design domain corresponding to the automated driving function application.

Optionally, the third message further includes tenth indication information, and the tenth indication information indicates a fallback-ready user status corresponding to the first vehicle.

Optionally, the third message further includes seventh indication information used to indicate a capability of the first vehicle.

Optionally, the capability includes at least one of the following: a current sensing capability, a current horizontal control capability, a current vertical control capability, a minimal risk condition that can be currently reached, a maximum sensing capability of a system, a maximum horizontal control capability of the system, a maximum vertical control capability of the system, or a minimal risk condition that can be currently reached by the system.

Optionally, the third message further includes eighth indication information used to indicate the automated driving function application and/or ninth indication information used to indicate an operational design domain corresponding to the automated driving function application.

Optionally, the third message further includes eleventh indication information used for confidence of at least one piece of indication information in the third message or comprehensive confidence of all pieces of indication information included in the third message.

The fourth message further includes twelfth indication information used for confidence of at least one piece of indication information in the fourth message or comprehensive confidence of all pieces of indication information included in the fourth message.

The foregoing descriptions about implementations allow a person skilled in the art to understand that, for the purpose of convenient and brief description, division of the foregoing functional modules is taken as an example for illustration. In actual application, the foregoing functions can be allocated to different modules and implemented according to a requirement. In other words, an inner structure of an apparatus is divided into different functional modules to implement all or some of the functions described above.

In the several embodiments provided in this application, it should be understood that the disclosed apparatus and method may be implemented in other manners. For example, the described apparatus embodiment is merely an example. For example, the module or unit division is merely logical function division and may be other division in actual implementation. For example, a plurality of units or components may be combined or integrated into another apparatus, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may be one or more physical units, may be located in one place, or may be distributed on different places. Some or all of the units may be selected based on actual requirements to achieve the objectives of the solutions of the embodiments.

Based on a same technical concept, an embodiment of this application further provides a computer-readable storage medium. The computer-readable storage medium stores a computer program, the computer program includes at least three segments of code, and the at least three segments of code may be respectively executed by an apparatus for indicating automated driving information, an apparatus for obtaining automated driving information, an apparatus for sending automated driving information, to separately control the apparatus for indicating automated driving information, the apparatus for obtaining automated driving information, and the apparatus for sending automated driving information to implement the foregoing method embodiments.

Methods or algorithm steps described in combination with the content disclosed in this embodiment of this application may be implemented by hardware, or may be implemented by a processor by executing a software instruction. The software instruction may include a corresponding software module. The software module may be stored in a random access memory (RAM for short), a flash memory, a read only memory (ROM), an erasable programmable read only memory (Erasable Programmable ROM, EPROM), an electrically erasable programmable read only memory (Electrically EPROM, EEPROM), a register, a hard disk, a mobile hard disk, a compact disc read only memory (CD-ROM), or any other form of storage medium well-known in the art. For example, a storage medium is coupled to a processor, so that the processor can read information from the storage medium or write information into the storage medium. Certainly, the storage medium may be a component of the processor. The processor and the storage medium may be located in the ASIC. In addition, the ASIC may be located in network equipment. Certainly, the processor and the storage medium may exist in network equipment as discrete components.

A person skilled in the art should be aware that in the foregoing one or more examples, functions described in the embodiments of this application may be implemented by hardware, software, firmware, or any combination thereof When the present application is implemented by software, the foregoing functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a general-purpose or dedicated computer.

The foregoing describes the embodiments of this application with reference to the accompanying drawings. However, this application is not limited to the foregoing specific implementations. The foregoing specific implementations are merely examples, and are not intended to limit the implementations. In light of this application, a person of ordinary skill in the art may further make many forms within the protection scope of this application without departing from the purposes and claims of this application. All fall within the protection scope of this application.

What is claimed is:

1. A method for indicating automated driving information, comprising: starting, by a first vehicle, an automated driving function application, or receiving, by the first vehicle, an instruction used to instruct the first vehicle to start the automated driving function application; and indicating, by the first vehicle using first indication information, to an information obtaining object external to the first vehicle, that a driving status of the first vehicle is an automated driving state, wherein the first indication information comprises at least one of the following: an identifier disposed on a body of the first vehicle, a preset sound signal sent by the first vehicle, a preset light signal sent by the first vehicle, or a preset light color signal sent by the first vehicle; wherein the method further comprises: indicating, by the first vehicle using second indication information, a fallback-ready user status corresponding to the first vehicle, wherein the fallback-ready user status includes one or both of a takeover capability and a response time of a fallback-ready user; and indicating, by the first vehicle using fourth indication information, a type of the automated driving function application to be executed or being executed, wherein the type includes a parking function or a cruise function.

2. The method according to claim 1, wherein the first indication information further indicates a driving automation level of the automated driving function application.

3. The method according to claim 1, further comprising: indicating, by the first vehicle using third indication information, a capability of the first vehicle.

4. The method according to claim 1, further comprising: indicating, by the first vehicle using fifth indication information, operational design domain conditions corresponding to the automated driving function application.

5. The method according to claim 1, wherein
the first indication information comprises a preset electromagnetic wave signal sent by the first vehicle.

6. The method according to claim 1, wherein light signals of different colors are used to indicate different driving automation levels.

7. An apparatus in a first vehicle for indicating automated driving information, the apparatus comprising a processor, configured to invoke a program stored in a memory, wherein the program, when executed by the processor, causes the apparatus to: start an automated driving function application, or receive an instruction used to instruct the first vehicle to start an automated driving function application; and indicate using first indication information, to an information obtaining object external to the first vehicle, that a driving status of the first vehicle is an automated driving state, wherein the first indication information comprises at least one of the following: an identifier disposed on a body of the first vehicle, a preset sound signal sent by the first vehicle, a preset light signal sent by the first vehicle, or a preset light color signal sent by the first vehicle; wherein the program, when executed by the processor, further causes the apparatus to: indicate using second indication information, a fallback-ready user status corresponding to the first vehicle, wherein the fallback-ready user status includes one or both of a takeover capability and a response time of a fallback-ready user; and indicate using fourth indication information, a type of the automated driving function application to be executed or being executed, wherein the type includes a parking function or a cruise function.

8. The apparatus according to claim 7, wherein the first indication information further indicates a driving automation level of the automated driving function application.

9. The apparatus according to claim 7, wherein the program, when executed by the processor, further causes the apparatus to:
indicate using third indication information, a capability of the first vehicle.

10. The apparatus according to claim 7, wherein the program, when executed by the processor, further causes the apparatus to:
indicate using fifth indication information, operational design domain conditions corresponding to the automated driving function application.

11. The apparatus according to claim 7, wherein
the first indication information comprises a preset electromagnetic wave signal sent by the first vehicle.

12. The apparatus according to claim 7, wherein light signals of different colors are used to indicate different driving automation levels.

13. A non-transitory computer-readable storage medium, comprising a program, wherein when executed by a processor, the following steps are performed: starting, an automated driving function application of a first vehicle, or receiving, by the first vehicle, an instruction used to instruct the first vehicle to start an automated driving function application;
and indicating, using first indication information, to an information obtaining object external to the first vehicle, that a driving status of the first vehicle is an automated driving state, wherein the first indication information comprises at least one of the following: an identifier disposed on a body of the first vehicle, a preset sound signal sent by the first vehicle, a preset light signal sent by the first vehicle, or a preset light color signal sent by the first vehicle; wherein the steps further comprise: indicating, by the first vehicle using second indication information, a fallback-ready user status corresponding to the first vehicle, wherein the fallback-ready user status includes one or both of a takeover capability and a response time of a fallback-ready user; and indicating, by the first vehicle using fourth indication information, a type of the automated driving function application to be executed or being executed, wherein the type includes a parking function or a cruise function.

14. The non-transitory computer-readable storage medium according to claim 13, wherein when the program is executed by the processor, the following steps are further performed:
indicating, using third indication information, a capability of the first vehicle.

15. The method of claim 1, wherein the information obtaining object external to the first vehicle includes one or more of a pedestrian, a second vehicle, a roadside device, or a network communication device.

* * * * *